United States Patent
West et al.

(10) Patent No.: US 9,081,533 B1
(45) Date of Patent: Jul. 14, 2015

(54) SYSTEM AND METHOD FOR SEARCHING AND REMOTELY PRINTING SOCIAL NETWORKING DIGITAL IMAGES FOR PICKUP AT A RETAIL STORE

(71) Applicant: WALGREEN CO., Deerfield, IL (US)

(72) Inventors: Zach D. West, Chicago, IL (US); Mathew Alexander, Schaumburg, IL (US)

(73) Assignee: WALGREEN CO., Deerfield, IL (US)

( * ) Notice: Subject to any disclaimer, the term of this patent is extended or adjusted under 35 U.S.C. 154(b) by 162 days.

(21) Appl. No.: 13/675,671

(22) Filed: Nov. 13, 2012

Related U.S. Application Data

(60) Provisional application No. 61/684,124, filed on Aug. 16, 2012.

(51) Int. Cl.
*G06F 3/12* (2006.01)

(52) U.S. Cl.
CPC .......... *G06F 3/1296* (2013.01); *G06F 3/1272* (2013.01)

(58) Field of Classification Search
None
See application file for complete search history.

(56) References Cited

U.S. PATENT DOCUMENTS

| | | | |
|---|---|---|---|
| 2009/0006415 A1* | 1/2009 | McAniff et al. | 707/10 |
| 2009/0100109 A1* | 4/2009 | Turski et al. | 707/200 |
| 2010/0161631 A1* | 6/2010 | Yu et al. | 707/758 |
| 2010/0238483 A1* | 9/2010 | Nelson et al. | 358/1.15 |
| 2011/0004840 A1* | 1/2011 | Feinberg et al. | 715/772 |
| 2011/0047463 A1* | 2/2011 | Shepherd et al. | 715/723 |
| 2011/0157226 A1* | 6/2011 | Ptucha et al. | 345/638 |
| 2011/0157227 A1* | 6/2011 | Ptucha et al. | 345/638 |
| 2011/0157228 A1* | 6/2011 | Ptucha et al. | 345/638 |
| 2011/0216640 A1* | 9/2011 | Curtis | 369/100 |
| 2011/0314017 A1* | 12/2011 | Yariv et al. | 707/737 |
| 2011/0314208 A1* | 12/2011 | Feinberg et al. | 711/103 |
| 2012/0011540 A1* | 1/2012 | Pulford | 725/32 |
| 2012/0200892 A1* | 8/2012 | Hirayama et al. | 358/1.15 |
| 2012/0265758 A1* | 10/2012 | Han et al. | 707/737 |

(Continued)

OTHER PUBLICATIONS

Snapfish by hp, "Do more with your Facebook photos," Way Back Machine, URL: web.archive.org/web/20100727132440/http://www1.snapfish.com/snapfish/facebookprints, Jul. 27, 2010.

(Continued)

*Primary Examiner* — Nicholas Pachol
(74) *Attorney, Agent, or Firm* — Marshall, Gerstein & Borun LLP; Randall G. Rueth; Cary M. Pumphrey

(57) ABSTRACT

The method and system allow a user to launch, on an web-enabled device, a client application that retrieves images from a social networking database. The client application displays the retrieved images available for printing to a user, and in response to receiving a selection of an image, the client application retrieves social networking attributes associated with the selected image from the social networking database. In response to receiving one or more social networking attributes from the user, the client application transmits the selected image and associated social network attributes to a proprietary server. Moreover, upon receiving print order information, the client application additionally executes a location awareness application that determines a current location of the web-enabled device and subsequently, determines a proximal retail store to the current location of the web-enabled device. Thereafter, the remote printing system creates and transmits a print order that includes the selected image to the retail store for pickup.

21 Claims, 18 Drawing Sheets

(56) References Cited

U.S. PATENT DOCUMENTS

| | | | | |
|---|---|---|---|---|
| 2012/0300087 | A1* | 11/2012 | Shore et al. | 348/207.1 |
| 2012/0300972 | A1* | 11/2012 | Rodriguez | 382/100 |
| 2012/0300974 | A1* | 11/2012 | Rodriguez | 382/100 |
| 2013/0003126 | A1* | 1/2013 | Van Osdol et al. | 358/1.15 |
| 2013/0173430 | A1* | 7/2013 | Benjamin | 705/26.63 |
| 2013/0246345 | A1* | 9/2013 | Eisler et al. | 707/608 |
| 2013/0311329 | A1* | 11/2013 | Knudson et al. | 705/26.9 |
| 2013/0339435 | A1* | 12/2013 | De Armas | 709/204 |
| 2013/0339437 | A1* | 12/2013 | De Armas | 709/204 |
| 2014/0002342 | A1* | 1/2014 | Fedorovskaya et al. | 345/156 |
| 2014/0002644 | A1* | 1/2014 | Fedorovskaya et al. | 348/143 |
| 2014/0003648 | A1* | 1/2014 | Fedorovskaya et al. | 382/100 |
| 2014/0003652 | A1* | 1/2014 | Fedorovskaya et al. | 382/103 |
| 2014/0003716 | A1* | 1/2014 | Fedorovskaya et al. | 382/170 |
| 2014/0003737 | A1* | 1/2014 | Fedorovskaya et al. | 382/276 |

OTHER PUBLICATIONS

Business Wire, "Target is First Mass Retailer to Offer Social Network Connectivity at Kodak Picture Kiosks," URL: www.businesswire.com/news/home/20101090055000/en/Target-Mass-Retailer-Offer-Social-Network-Connectivity, Oct. 9, 2010.

StarNews Online, "CVS offers way to print photos from Facebook," URL: www.starnewsonline.com/article/20111104/articles/111109830, Nov. 4, 2011.

Yearbound, "A Yearbook of Your Facebook," Way Back Machine, URL: web.archive.org/web/20110609034122/http://yearbound.net/, Jun. 9, 2011.

Jot Journal, "Never lose a moment! Turn your Facebook posts into a book in one click!," Way Back Machine, URL: web.archive.org/web/20110623103451/http://www.myjotjournal.com/, Jun. 23, 2011.

* cited by examiner

SYSTEM AND METHOD FOR SEARCHING AND REMOTELY PRINTING SOCIAL NETWORKING DIGITAL IMAGES FOR PICKUP AT A RETAIL STORE

RELATED APPLICATIONS

This application claims benefit to U.S. Patent Application No. 61/684,124, filed on Aug. 16, 2012, and entitled "SYSTEM AND METHOD FOR SEARCHING SOCIAL NETWORKING DIGITAL IMAGES AND REMOTELY PRINTING DIGITAL IMAGES FOR PICKUP AT A RETAIL STORE," the entirety of which is hereby incorporated herein by reference for all purposes.

TECHNICAL FIELD

The present disclosure generally relates to a system and a method for searching and remotely printing social networking digital images and, more particularly, to a remote printing method and system that allows a user to search and filter social networking images and to remotely print the selected images at a retail store for pickup.

BACKGROUND

Digital photography has recently overcome traditional film photography with the low cost of digital cameras, the high quality of digital photographs, and the flexibility of transferring the digital images to others. Moreover, digital images allow for one to view the captured images on a digital display interface screen such as a display interface screen of a computer or tablet. Users may store their digital images on a stored medium, such as a disc or a solid state drive, and share the digital medium with others. Additionally, a user may upload their digital images to a website for storage or for sharing with others via a social networking site or online photo album website. Despite the many options available for viewing digital images on a display interface screen, many users still wish to print a hard copy of a captured image for viewing and sharing.

For example, users may acquire a personal photo printer to print digital images out at home. This conventional technique can be very expensive given the costs of the printing equipment, the photograph quality printing paper, and the ink. Other techniques of printing digital images include transferring and storing a captured digital image on a storage medium and physically traveling to a retail store to print out the digital image from the storage medium. This technique is time consuming and cumbersome. More recently, retail stores have offered printing services via their website on the Internet. Users may upload a digital image to the website of the retail store and have the digital images delivered via the mail. Again, this technique is time consuming, as it requires the photographer to wait for the prints to be delivered. More recently, sophisticated image capturing and sharing software has become available for smartphones that allow a user to capture an image and immediately share the image with a third party social networking site. Users may view the captured images via their smartphone or via the website or mobile application of the social networking website.

Because smartphones allow for easy and fast image uploads, social networking websites have rapidly become a hub for users to share digital images with each other, and as a result, social networking websites now maintain some of the largest repositories of digital images. Moreover, social networking websites allow users to generate a multitude of information or attributes associated with each image including user comments, identifying other users in an image, a location and a date of the image, etc. With the ever-increasing number of uploaded images and associated information, users may quickly become overwhelmed in locating a particular image to view or to print out. Furthermore, even if a user locates a particular image, the user is unable to print the image and the associated information or attributes.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION

Figure 1A:
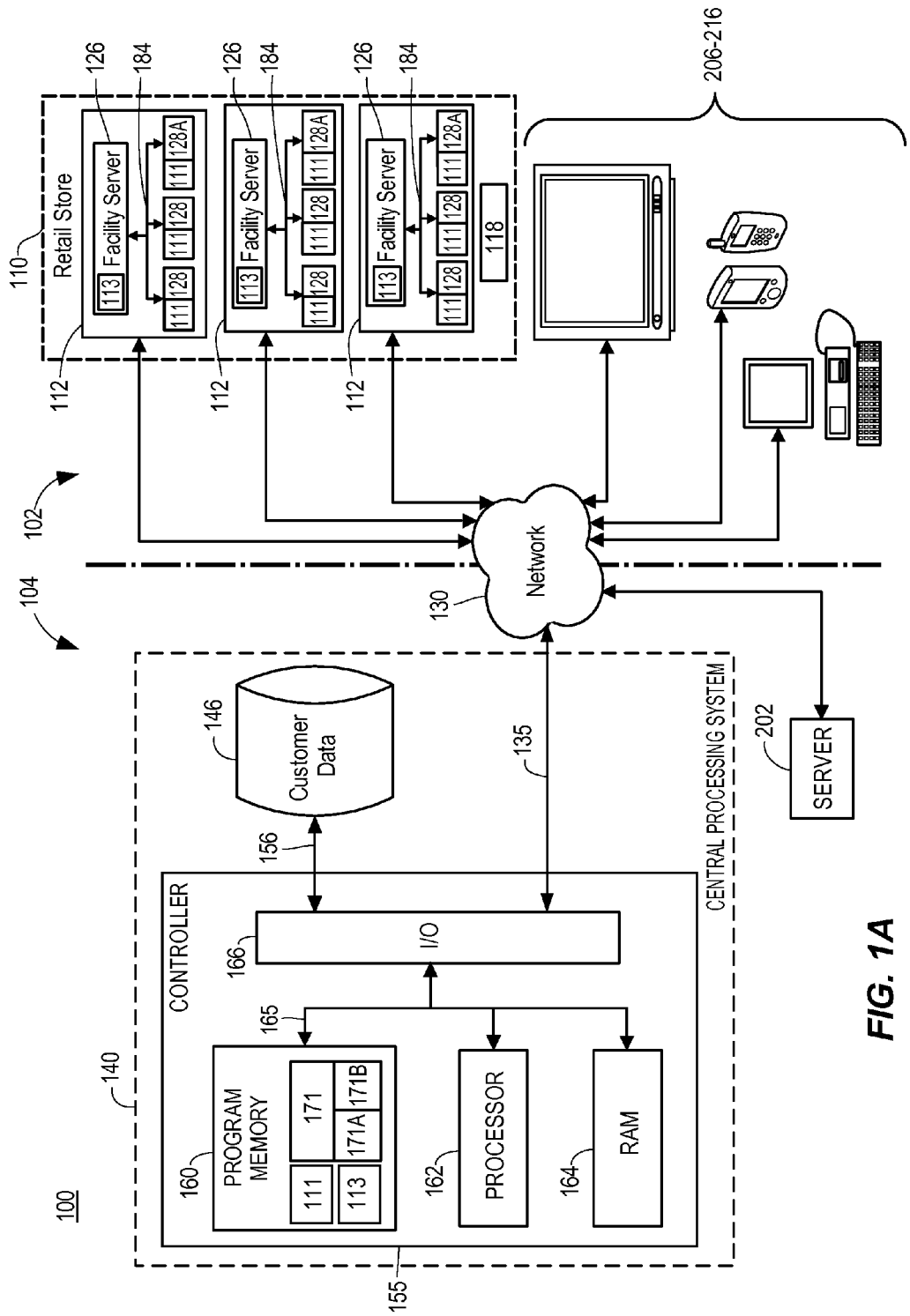
FIG. 1A illustrates a block diagram of a computer network and system on which an exemplary automatic data access system and method may operate in accordance with the described embodiments.

FIG. 1A illustrates various aspects of an exemplary architecture implementing a remote printing system 100. In particular, FIG. 1A illustrates a block diagram of the remote printing system 100. The high-level architecture includes both hardware and software applications, as well as various data communication channels for communicating data between the various hardware and software components. The remote printing system 100 may be roughly divided into front-end components 102 and back-end components 104. The front-end components 102 are primarily disposed within a retail network 110 including one or more retail stores 112. The retail stores 112 may be located, by way of example rather than limitation, in separate geographic locations from each other, including different areas of the same city, different cities, or even different states, and each of the retail stores 112 is preferably an in-store retail store. The front-end components 102 comprise a number of workstations 128. The workstations 128 are local computers located in the various retail stores 112 throughout the retail network 110 and executing various image-related applications. Retail store personnel (not shown) use the workstations 128 to access customer information, access images and payment information and so forth. Each of the retail stores 112 may be, for example, an in-store retail store, an on-line store, or a mail-order store. The retail network 110 may also include one or more warehouses or central-printing facilities 118. The warehouses or central-printing facilities 118 may distribute image prints to the various retail stores 112 in the retail network 110, or may distribute image prints directly to customers. Internet-enabled devices (or client devices) 206-216 (e.g., personal computers, cellular phones, smart phones, internet-enabled televisions, etc.) may be communicatively connected to the retail stores 112 and to a system 140 through a digital network 130, as described below.

Those of ordinary skill in the art will recognize that the front-end components 102 could also comprise a plurality of facility servers 126 disposed at the plurality of retail stores 112 instead of, or in addition to, a plurality of workstations 128. Each of the retail stores 112 may include one or more facility servers 126 that may facilitate communications between the workstations 128 of the retail stores 112 via a digital network 130, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 also refers to the facility servers 126, and vice versa. Moreover, environments other than the retail stores 112 may employ the workstations 128 and the servers 126. As used herein, the term "retail store" refers to any of these environments (e.g., kiosks, Internet interface terminals, etc.)

The front-end components 102 communicate with the back-end components 104 via the digital network 130. One or more of the front-end components 102 may be excluded from communication with the back-end components 104 by configuration or by limiting access due to security concerns. For example, the internet-enabled devices 206-216 may be excluded from direct access to the back-end components 104. In some embodiments, the retail stores 112 may communicate with the back-end components via the digital network 130. In other embodiments, the retail stores 112 and internet-enabled devices 206-216 may communicate with the back-end components 104 via the same digital network 130, but digital access rights, IP masking, and other network configurations may deny access to the internet-enabled devices 206-216.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more proprietary servers 202 (described below), the back-end components 104 include the central processing system 140. Of course, the retail stores 112 may be communicatively connected to different back-end components 104 having one or more functions or capabilities that are similar to the central processing system 140. The central processing system 140 may include one or more computer processors 162 adapted and configured to execute various software applications and components of the remote printing system 100, in addition to other software applications. The central processing system 140 further includes a database 146. The database 146 is adapted to store data related to the operation of the remote printing system 100 (e.g., customer profile data, past print purchases, images uploaded to the customer account, etc.) The central processing system 140 may access data stored in the database 146 when executing various functions and tasks associated with the operation of the remote printing system 100.

Although FIG. 1A depicts the remote printing system 100 as including the central processing system 140 in communication with three retail stores 112, and various internet-enabled devices 206-216 it should be understood that different numbers of processing systems, pharmacies, and devices may be utilized. For example, the digital network 130 (or other digital networks, not shown) may interconnect the central processing system 140 to a plurality of included central processing systems 140, hundreds of retail stores 112, and thousands of internet-enabled devices 206-216. According to the disclosed example, this configuration may provide several advantages, such as, for example, enabling near real-time uploads and downloads of information as well as periodic uploads and downloads of information. This provides for a primary backup of all the information generated in the remote printing process. Alternatively, some of the retail stores 112 may store data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

The program memory 160 may also contain machine-readable instructions (i.e., software) 171, for execution by the processor 162. The software 171 may perform the various tasks associated with operation of the retail store or retail stores, and may be a single module 171 or a plurality of modules 171A, 171B. While the software 171 is depicted in FIG. 1A as including two modules, 171A and 171B, the software 171 may include any number of modules accomplishing tasks related to retail store operation including, for example, receiving print orders, managing printing workflow, etc. The central processing system 140 implements a server application 113 for providing data to a user interface application 111 operating on the workstations 128.

Figure 1B:
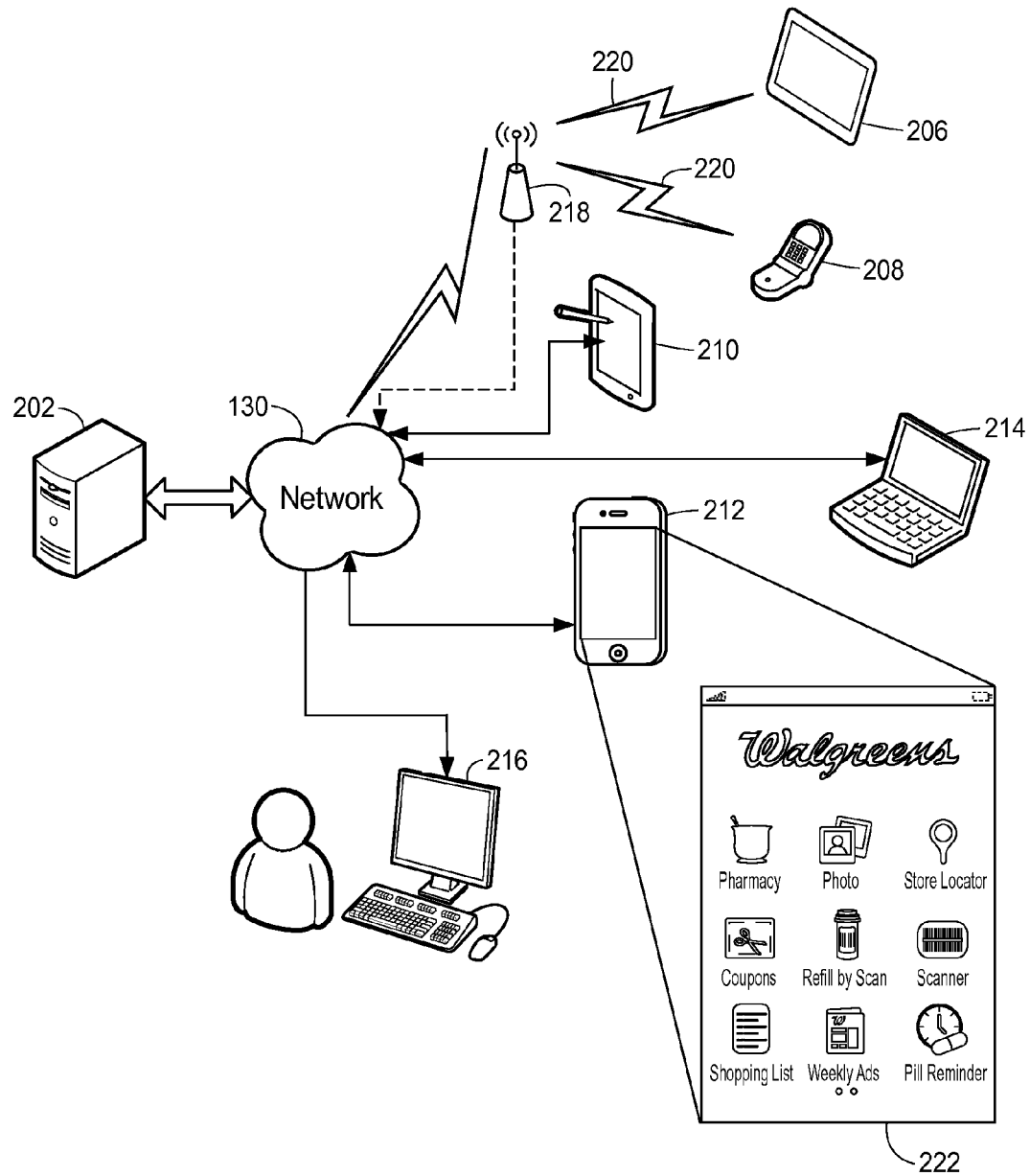
FIG. 1B illustrates internet-enabled devices and associated equipment that may operate with a network and a server.

For purposes of implementing the remote printing system 100, the user interacts with the proprietary server 202 and the retail store systems (e.g., the central processing system 140) via an internet-enabled device 206-216 (e.g., mobile device application, etc.), a specialized application, or a plurality of web pages. FIG. 1B depicts the proprietary server 202 connected via the network 130 to the internet-enabled devices 206-216 through which a user may initiate and interact with the remote printing system 100 (as shown in FIG. 1A). The internet-enabled devices 206-216 may include, by way of example, a tablet computer 206, an internet-enabled cell phone 208, a personal digital assistant (PDA) 210, a mobile device smart-phone 212 also referred to herein as a "mobile device," a laptop computer 214, a desktop computer 216, a portable media player (not shown), etc. Of course, any internet-enabled device 206-216 appropriately configured may interact with the remote printing system 100. The internet-enabled devices 206-216 need not necessarily communicate with the network 130 via a wired connection. In some instances, the internet-enabled devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the internet-enabled devices 206-216 may interact with the proprietary server 202 to receive web pages or server data from the proprietary server 202 and may display the web pages or server data via a client application (described below). For example, the mobile device 212 may display a home screen 222 (i.e., the root or start page at which users enter the client application) of the client application to the user, may receive an input from the user, and may interact with the proprietary server 202 depending on the type of user-specified input. As another example, the desktop computer 216 may display a social networking website page 221 of a web browser (described below). It will be appreciated that although only one proprietary server 202 is depicted in FIG. 1B, multiple proprietary servers 202 may be provided for the purpose of distributing server load, serving different web pages, implementing different portions of the retail store web interface, etc. These multiple proprietary servers 202 may include a web server, an entity-specific server (e.g. an Apple® server, etc.), a server that is disposed in a retail or proprietary network, an independent third-party server that is not under the control of the entity, etc.

Figure 1C:
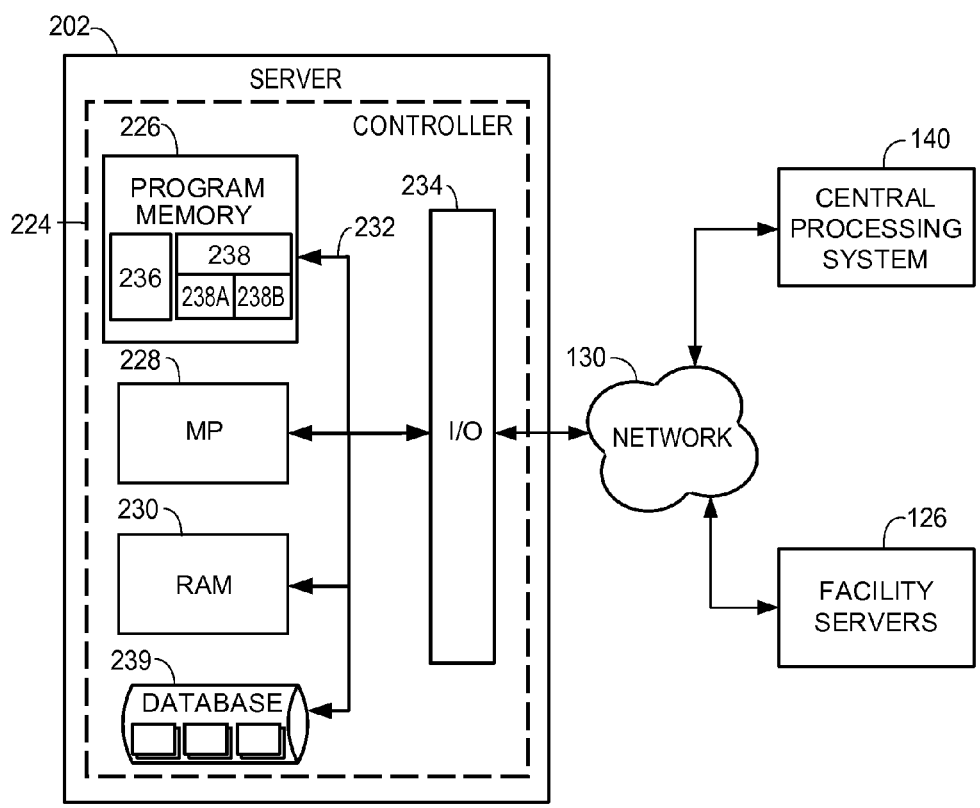
FIG. 1C illustrates a block diagram of an exemplary server.

Turning now to FIG. 1C, the proprietary server 202, like the facility server 126, includes a controller 224. Similar to the controllers 155 and 170, the controller 224 includes a program memory 226, a microcontroller or a microprocessor (MP) 228, a random-access memory (RAM) 230, and an input/output (I/O) circuit 234, all of which are interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as customer web profiles, product data, mobile device application data, web page templates and/or web pages, and other data necessary to interact with the user through the network 130. As discussed with reference to the controllers 155 and 170, it should be appreciated that although FIG. 1C depicts only one microprocessor 228, the controller 224 may include multiple microprocessors 228. Similarly, the memory of the controller 224 may include multiple RAMs 230 and multiple program memories 226. Although the FIG. 1C depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the internet-enabled devices 206-216, as depicted in FIG. 1B, FIG. 1C illustrates that the proprietary server 202 may also be connected through the network 130 to the central processing system 140 and/or one or more facility servers 126. As described below, the connection of the proprietary server 202 to the central processing system 140 assists in facilitating some of the functionality of the remote printing process. As a result, the proprietary server 202 may act as a routing or interfacing server between the plurality of internet-enabled devices 206-216 and a destination server, namely, the central processing system 140. For example, the proprietary server 202 may be configured to communicate the central processing system 140 and with the internet-enabled device 206-216 via a multitude of protocols, such as packet-switched protocols, web services, web APIs (Application Programming Interface), etc. The proprietary server 202 may also convert (if necessary) and route client application data (not shown) to the appropriate server, such as the central process system 140 for example. Additionally, the proprietary server 202 may act as the destination server and need not route any data from the internet-enabled device 206-216.

As shown in FIG. 1C, the program memory 226 and/or the RAM 230 may store various applications for execution by the microprocessor 228. For example, a user-interface application 236 may provide a user interface to the proprietary server 202, which user interface may, for example, allow a network administrator to configure, troubleshoot, or test various aspects of the server's operation, or otherwise to access information thereon. A server application 238 operates to populate and transmit client application data and web pages to the internet-enabled devices 206-216, receive information from the user transmitted back to the proprietary server 202, and forward appropriate data to the central processing system 140 and the facility servers 126, as described below. Like the software 171 of FIGS. 1A and 1B, the server application 238 may be a single module 238 or a plurality of modules 238A, 238B. While the server application 238 is depicted in FIG. 1C as including two modules, 238A and 238B, the server application 238 may include any number of modules accomplishing tasks related to implantation of the proprietary server 202. By way of example, the module 238A may populate and transmit the client application data and/or may receive and evaluate inputs from the user to receive a data access request, while the module 238B may communicate with one or more of the back end components 104 to fulfill a data access request.

Figure 1D:
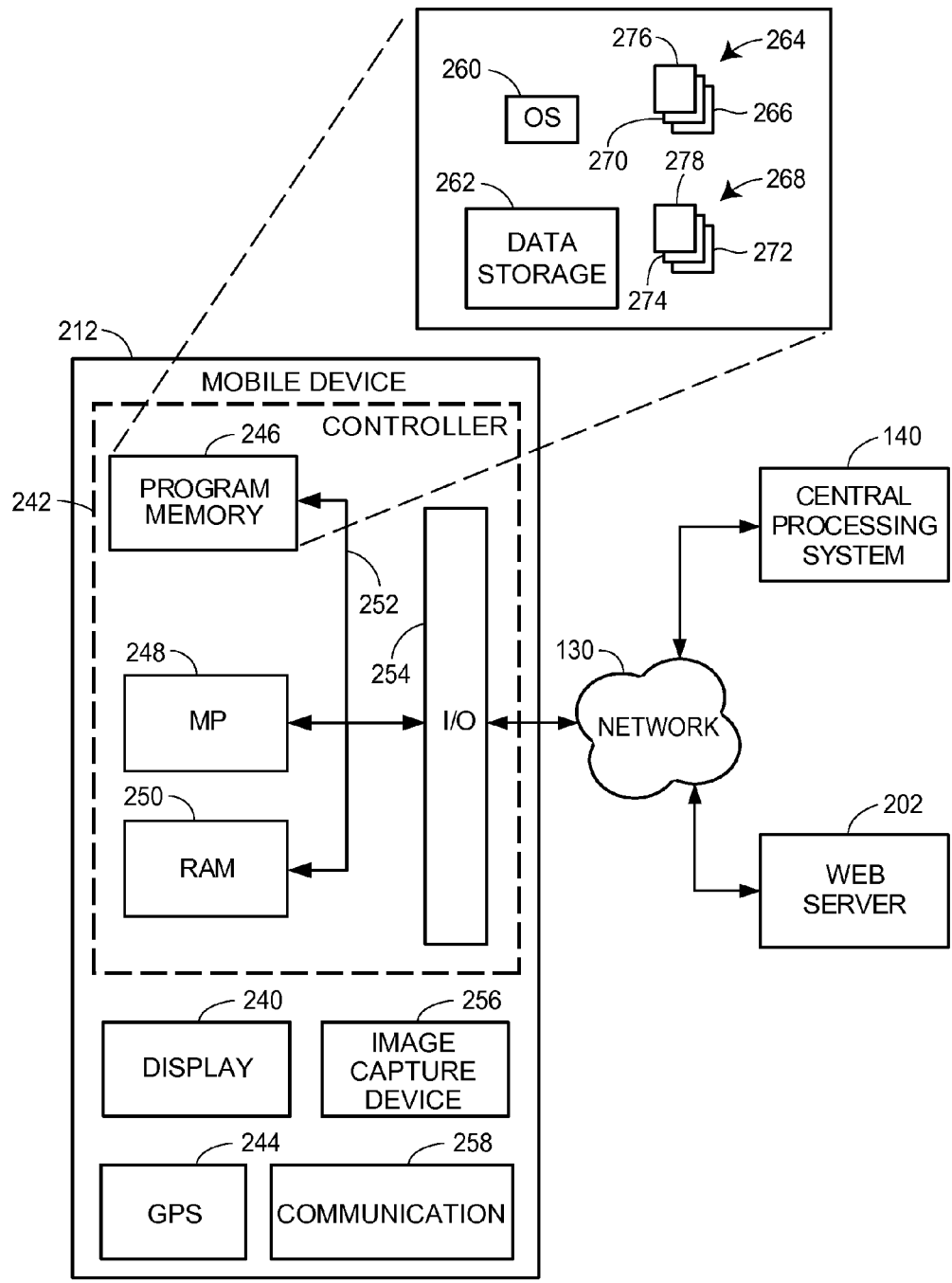
FIG. 1D illustrates a block diagram of an exemplary mobile device.

Referring now to FIG. 1D, the mobile device 212 (or any of the internet-enabled devices 206-216) includes a display 240, a Global Positioning System (GPS) unit 244, a communication unit 258, an image capture device 256, a user-input device (not shown), and, like the proprietary server 202, a controller 242. Similar to the controllers 155 and 224, the controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and other data necessary to interact with the proprietary server 202, the facility servers 126, or the server applications 113 through the digital network 130. In some embodiments, the controller 242 may also include, or otherwise be communicatively connected to, other data storage mechanisms (e.g., one or more hard disk drives, optical storage drives, solid state storage devices, etc.) that reside within the mobile device 212.

The GPS unit 244 may use "Assisted GPS" (A-GPS), satellite GPS, or any other suitable global positioning protocol or system that locates the position of the mobile device 212. For example, A-GPS utilizes terrestrial cell phone towers or wi-fi hotspots (e.g., wireless router points) to more accurately and more quickly determine location of the mobile device 212 while satellite GPS generally are more useful in more remote regions that lack cell towers or wifi hotspots. The communication unit 258 may communicate with the proprietary server 202 via any suitable wireless communication protocol network, such as a wireless telephony network (e.g., GSM, CDMA, LTE, etc.), a wi-fi network (802.11 standards), a WiMAX network, a Bluetooth network, etc. The image capture device 256 may be a built-in camera within the mobile device 212 or may be an external camera, such as a webcam, that is communicatively coupled with the mobile device 212 (or any other internet-enabled device 206-216). The user-input device (not shown) may include a "soft" keyboard that is displayed on the display 240 of the mobile device 212, an external hardware keyboard communicating via a wired or a wireless connection (e.g., a Bluetooth keyboard), an external mouse, or any other suitable user-input device. As discussed with reference to the controllers 155 and 224, it should be appreciated that although FIG. 1D depicts only one microprocessor 248, the controller 242 may include multiple microprocessors 248. Similarly, the memory of the controller 242 may include multiple RAMs 250 and multiple program memories 246. Although the FIG. 1D depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the mobile device 212. One of the plurality of applications 264 may be a native web browser 270, such as, for example, Apple's Safari®, Google Android™ mobile web browser, Microsoft Internet Explorer® for Mobile, Opera Mobile™, that may be implemented as a series of machine-readable instructions for receiving, interpreting, and displaying web page information from the proprietary server 202, the facility servers 126, or the server applications 113 while also receiving inputs from the user. Another application of the plurality of applications may include a location awareness application 276 that may be implemented as a series of machine-readable instructions for receiving, interpreting, and displaying location information of mobile device 212 (or any other internet-enabled device 206-216) from the GPS unit 244. One of the plurality of routines may include an image capture routine 272 that coordinates with the image capture device 256 to retrieve image data for use with one or more of the plurality of applications, such as the client application 266, or for use with other routines. Another routine in the plurality of routines may include an image display routine 274 that receives and interprets image data of any type or format for display. Likewise, the image display routine 274 coordinates with the image capture routine 272 to obtain image data and process the image data into a displayable format for use with the client application 266.

Preferably, a customer, or a user may launch the client application 266 from an internet-enabled device, such as one of the internet-enabled devices 206-216, to access the proprietary server 202 cooperating with the central processing system 140 to implement the remote printing system 100. Additionally, the customer or the user may also launch or instantiate any other suitable user interface application (e.g., the web browser 270, or any other one of the plurality of software applications 264) to access the proprietary server 202, the facility servers 126, or the server applications 113 to realize the remote printing system 100. Generally, the term "user" is used when referring to a person who is operating one of the internet-enabled devices 206-216 and is not exclusive of the term "customer." As described above, one or both of the databases 146 and 182, illustrated in FIGS. 1A and 1B, respectively, include various information about the retail store's customers and the prints printed by the retail store, as well as basic biographical information about the customer, such as a customer name, a customer address, a customer phone number, and the like. Customer records are among the exemplary data that the remote printing system 100 may store on the databases 146 and 182.

As shown in FIG. 1B, to access the proprietary server 202, the facility servers 126, or the server applications 113, the user executes the client application 266 on one of the internet-enabled devices 206-216, such as the mobile device 212. Using the client application 266, the user may request server data (not shown) by navigating a series of client application screens, such as the home screen 222 of the client application 266. FIGS. 2-10 depict client application pages or screens that the proprietary server 202, the facility servers 126, or the server applications 113 may transmit in various embodiments of the remote printing system 100. In any event, the user may launch the client application 266 from one of the internet-enabled devices 206-216 via any suitable manner, such as touch-selecting a client application icon (not shown) on the display 240 of the mobile device 212, double-clicking on the client application icon via a mouse of a computer 216 or a trackpad (not shown) of a laptop 214. After the user launches the client application 266, the home screen 222 of the client application 266 is displayed to the user on the mobile device 212.

Figure 2:
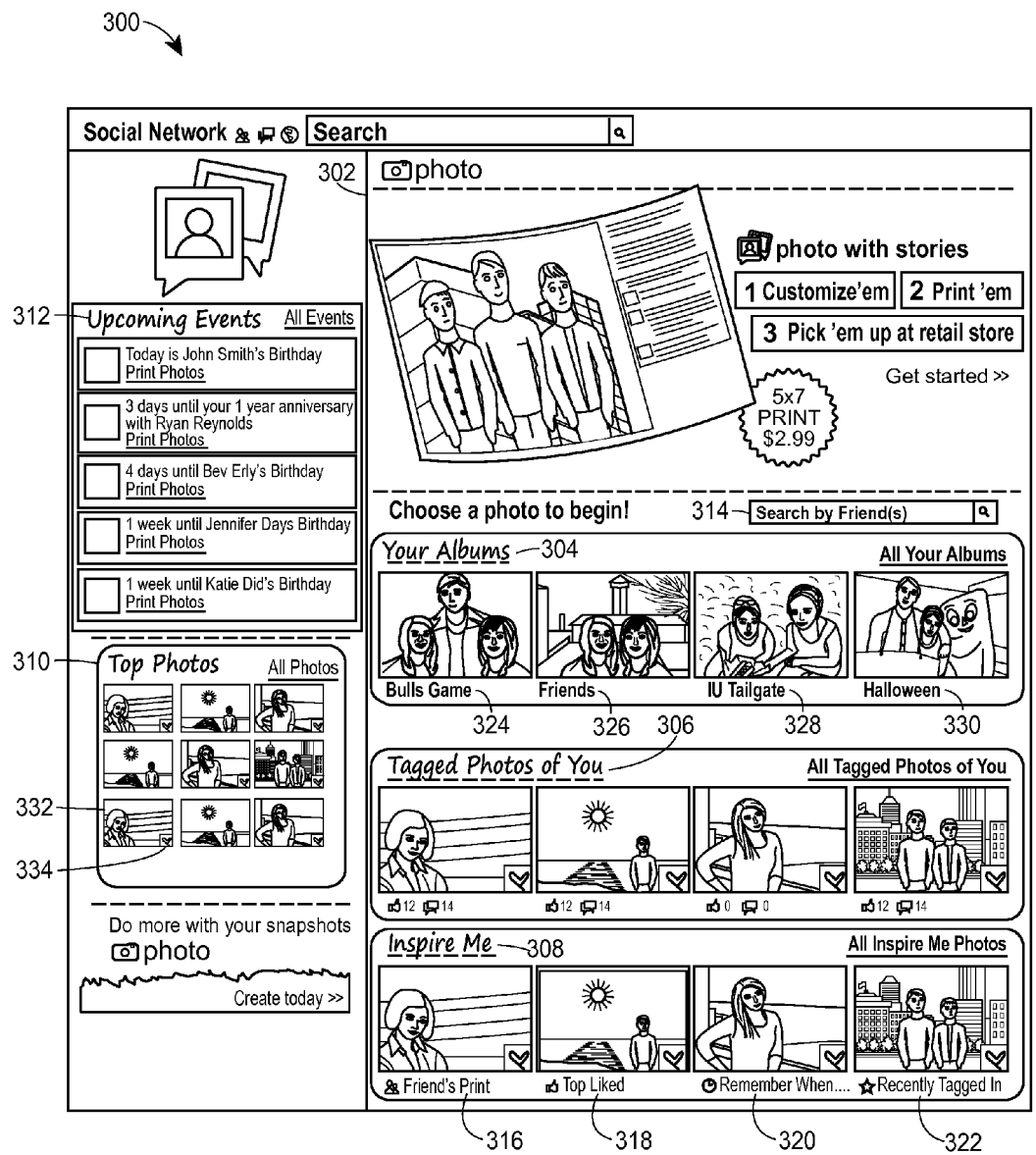
FIG. 2 depicts a landing page of a client application.

With reference now to FIG. 2, a landing page 300 of the client application 266, for example, is displayed to a user on a client device, such as a smartphone, tablet, laptop, etc. The landing page of the client application 266 may be stand alone or embedded within another website, such as a social networking website. The landing page may include a banner 302 that conveys directions, advertisements, etc. and various panels, dropdown fields, or search boxes that allow the user to preferably select an image category to signify the type of images the user desires to view. These image categories may include "Your Albums" 304, "Tagged Photos of You" 306, "Inspire Me" 308, "Top Photos" 310, "Upcoming Events" 312, "Search by Friend(s)" 314, etc. Each image category allows the user to initiate the filtering and displaying of images that are associated with the selected image category. For example, if the client application 266 receives a selection of the "Tagged Photos of You" image category from the user, the client application 266 may retrieve and display all images associated with the user (i.e. images that are tagged with the name of user). After the client application 266 displays the retrieved images, the client application 266 may receive a selection of a particular image from the user that denotes that the user may desire to create a print order for pick up at a retail store. In any event, an image category may also include more detailed image subcategories that further refine the subset of specified images to be displayed. For instance, under the "Inspire Me" category 308, the subcategories, "Friend's Print" 316, "Top Liked" 318, "Remember When . . . " 320, and "Recently Tagged In" 322 appear. Each of these subcategories may determine a more detailed subset of images to display to the user using social networking attribute data retrieved from the social networking database. When a particular image subcategory is specified by the user, the client application 266 may direct the user to another webpage or open a browser-embedded pop-up window that pre-selects the specified image subcategory and displays the corresponding detailed subset of images associated with the specified image subcategory (described below).

Figure 3:
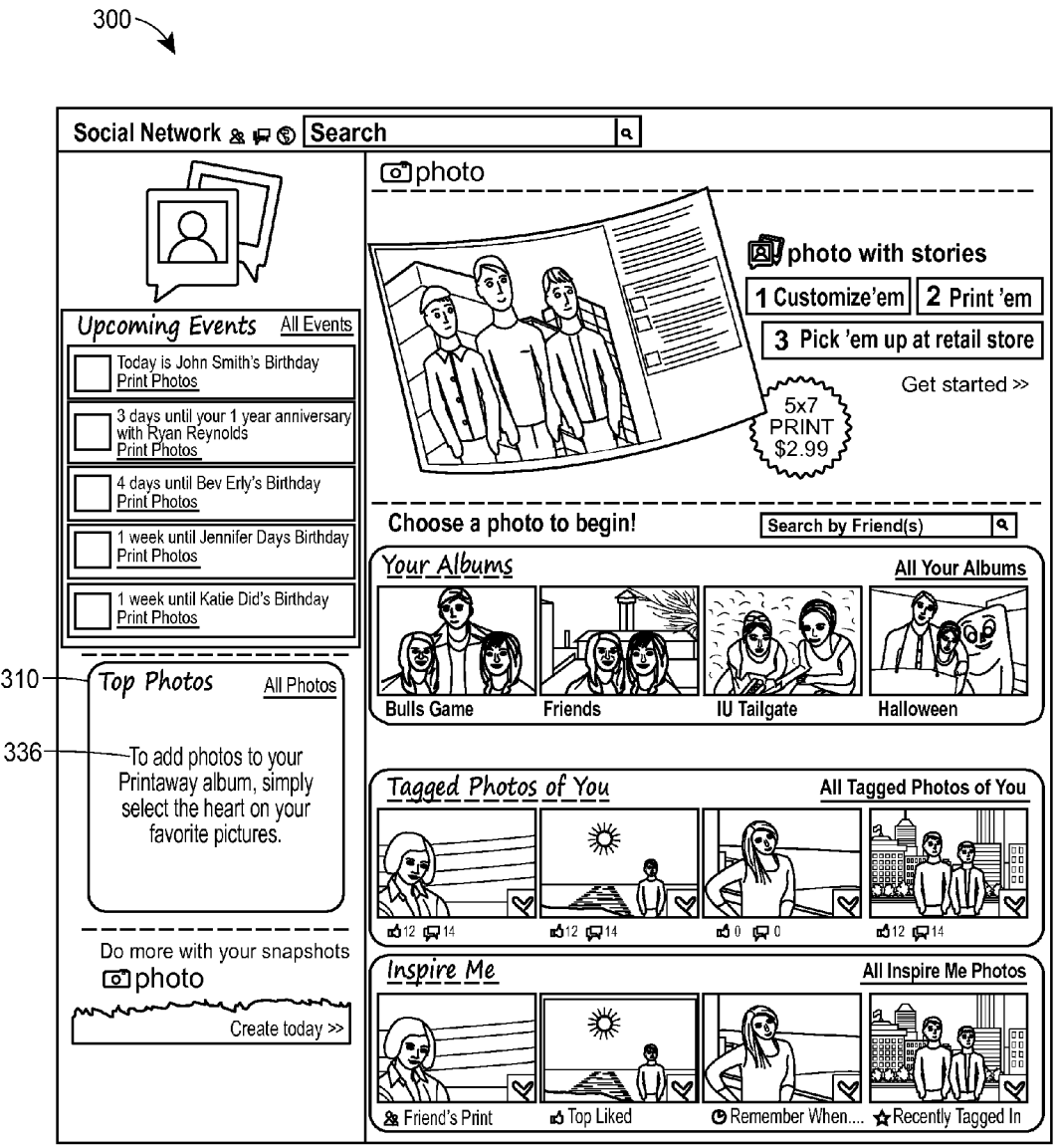
FIG. 3 depicts a landing page of a client application that does not include any user selected or favored images.

If applicable, the landing page 300 may display not only a specific category, but also a preview a sample of one or more images that are indicative of or are associated with that specific category. For example, under the "Your Albums" category 304, each of the four images (i.e. the images associated with the "Bulls Game" 324, "Friends" 326, "IU Tailgate" 328, and "Halloween" 330) is indicative of its respective photo album. Each image includes social networking attributes that the client application 266 may use in filtering or sorting images. For example, these social networking attributes associated with an image may include comments about or in relation to the image and may be generated by the user or others, positive indications (e.g. the user may "like" the image) in relation to the image and may be generated by the user or others, descriptions associated with the image that may be generated by the user that describe the image, a location denoting where the image may have been taken and may be generated by the user or may be embedded in the image by the mobile device 212, a date when the image was uploaded onto the social networking database, an indication of the identity of the user or other users that appear in the image (e.g. the user may "tag" himself or herself or others that appear in the image), etc. The client application 266 may only enable some of the image categories in response to a user input or a user action. For example, the "Top Photos" image category 310 may only include or display images that the user has favored or preferred through the user's "hearting" a particular photo. In this example, the client application 266 denotes a favored image 332 with a highlighted heart 334 to signify that the favored image 332 has been favored or "hearted" by the user or another user as a special image. However, if the user has not favored any images for example, then the client application 266 may not include any images under the "Top Photos" image category 310 as shown in FIG. 3 but rather, may include an instructional message 336 that informs the user how to favor an image for future use.

Figure 4:
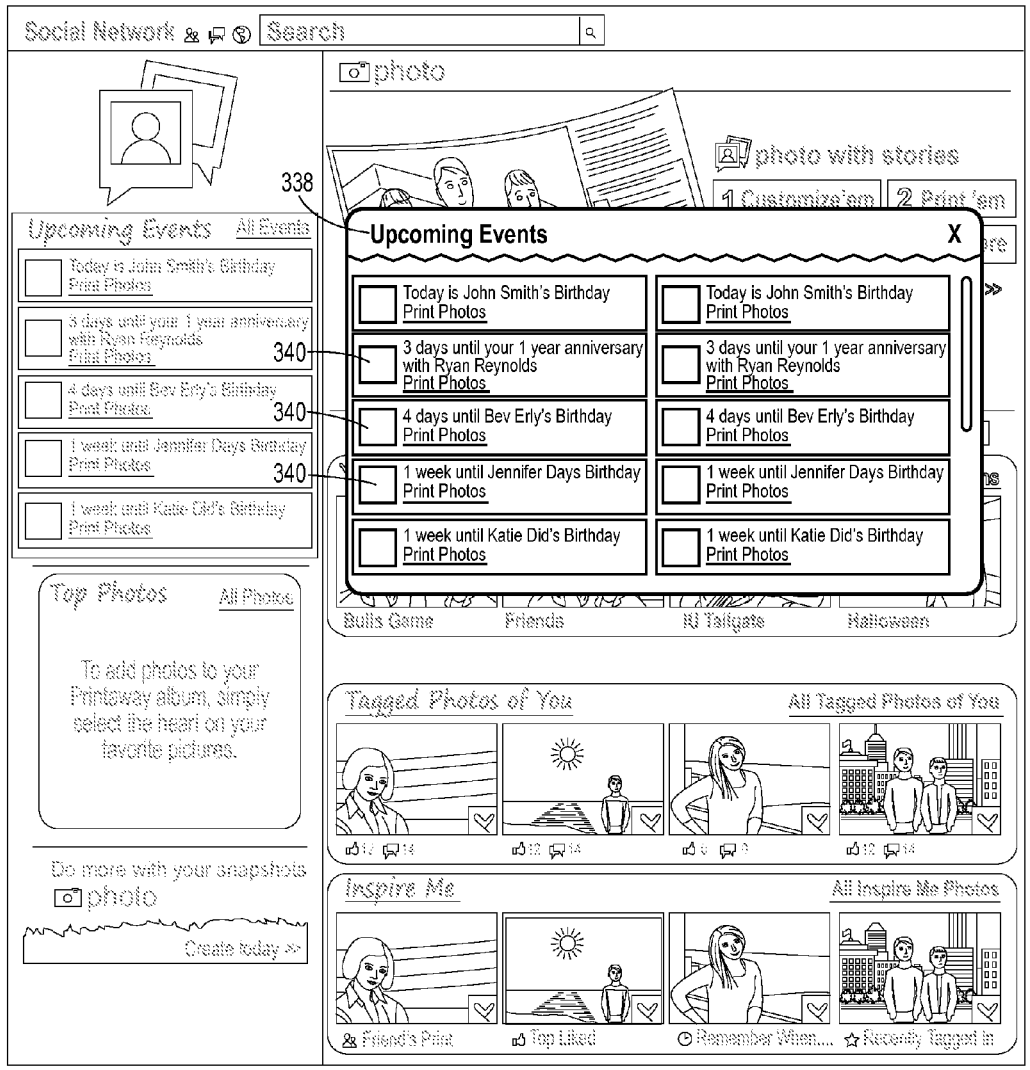
FIG. 4 depicts a landing page of a client application that includes an upcoming events pop-up window.

In any event, referring back to the landing page 300 of FIG. 2, if the user selects the "Upcoming Events" image category 311, the client application 266 may display to the user a new web page to the user or a browser-embedded pop-up window 338, as shown in FIG. 4, that includes one or more upcoming events 340 that are associated with the user or other users. If the client application 266 receives a selection from the user of one of the upcoming events 340, the client application 266 may retrieve and display to the user one or more images (not shown) relating to the selected upcoming event 340, the user, and/or other users. For example, if the selected upcoming event 340 includes the birthday of a friend of the user, the client application 266 may retrieve images associated with the birthday of the friend of the user, recently uploaded images associated with the friend of the user and the user, images associated with the user and the friend of the user from a previous birthday of the friend of the user, etc.

Figure 5:
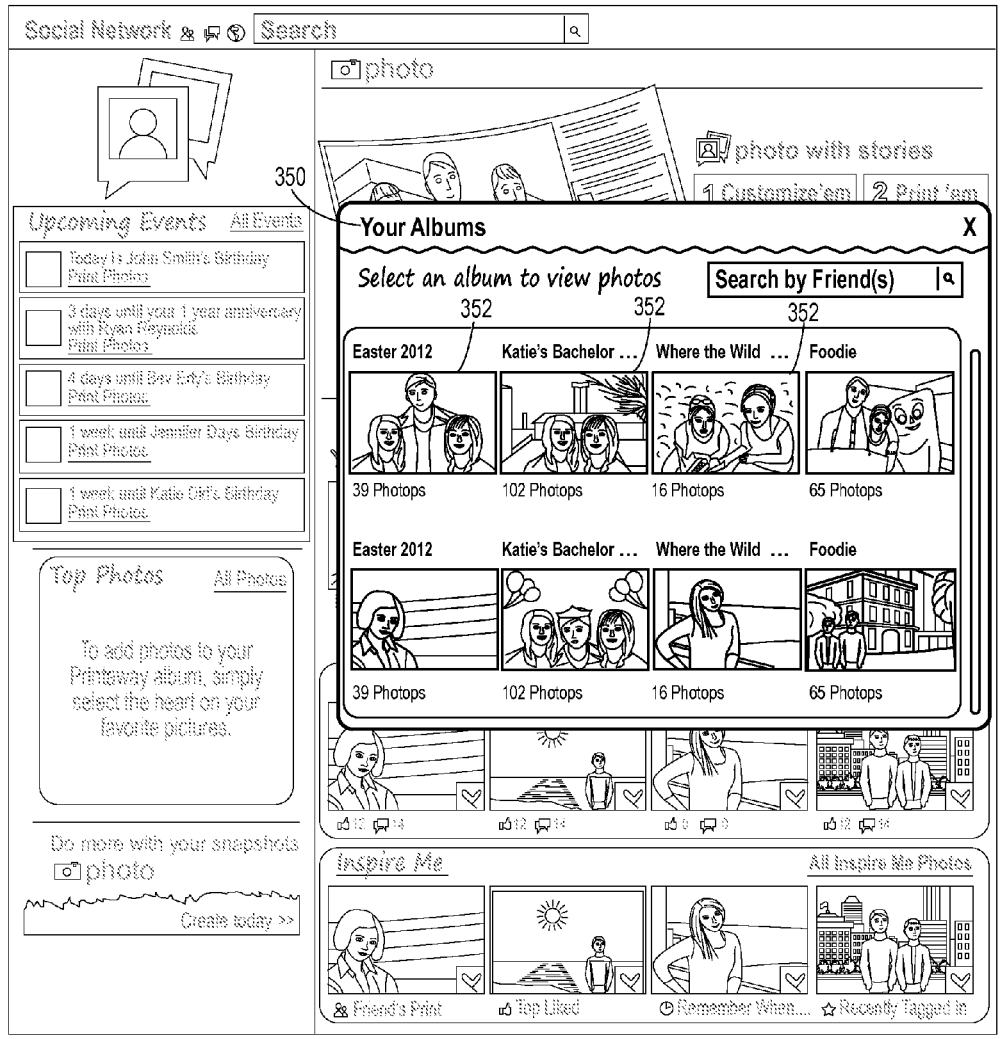
FIG. 5 depicts a landing page of a client application that includes a browser-embedded pop-up window that renders a grid of user-created albums.
Figure 6:
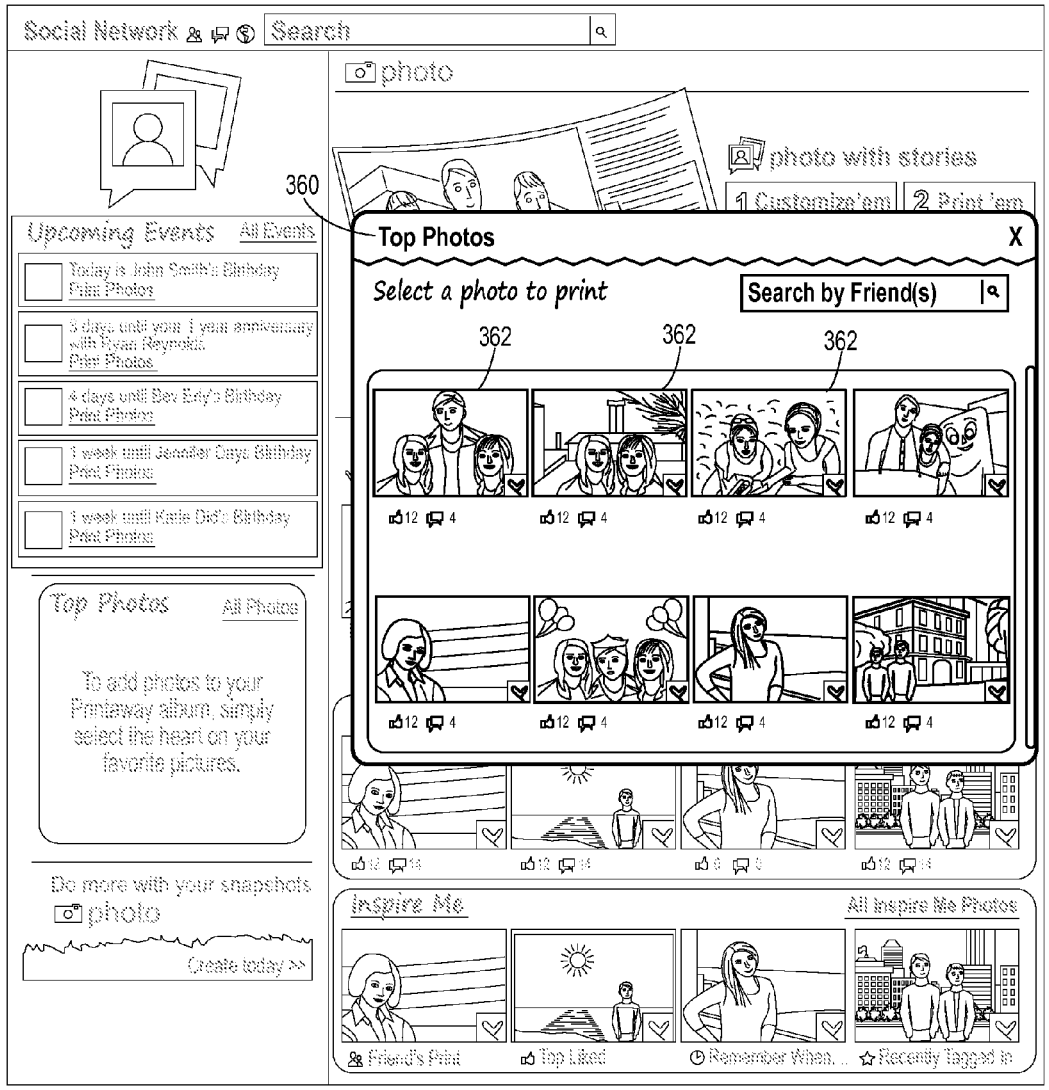
FIG. 6 depicts a landing page of a client application that includes a browser-embedded pop-up window that renders a grid of user-favored images.

Referring back to FIG. 2, if the user selects the "Your Album" image category 304 on the landing page 300, the client application 266 may direct the user to another web page or a browser-embedded pop-up window 350, as shown in FIG. 5, that displays all previously user created albums 352. In determining an image to remotely print for pick up at the retail store, the user may select any album 352 to cause the client application 266 to display one or more images associated with the selected album. Similarly, referring back to FIG. 2, if the user selects the "Top Photos" image category 310 from the landing page 300, the client application 266 may redirect the user to another web page or a browser-embedded pop-up window 360, as shown in FIG. 6, that displays one or more images the user or another user has favored or "hearted" as user-favored images 362 as described above. In response to receiving a user-favored image selection for printing from the user, the client application 266 may direct the user to a print preview page (described below).

Figure 7:
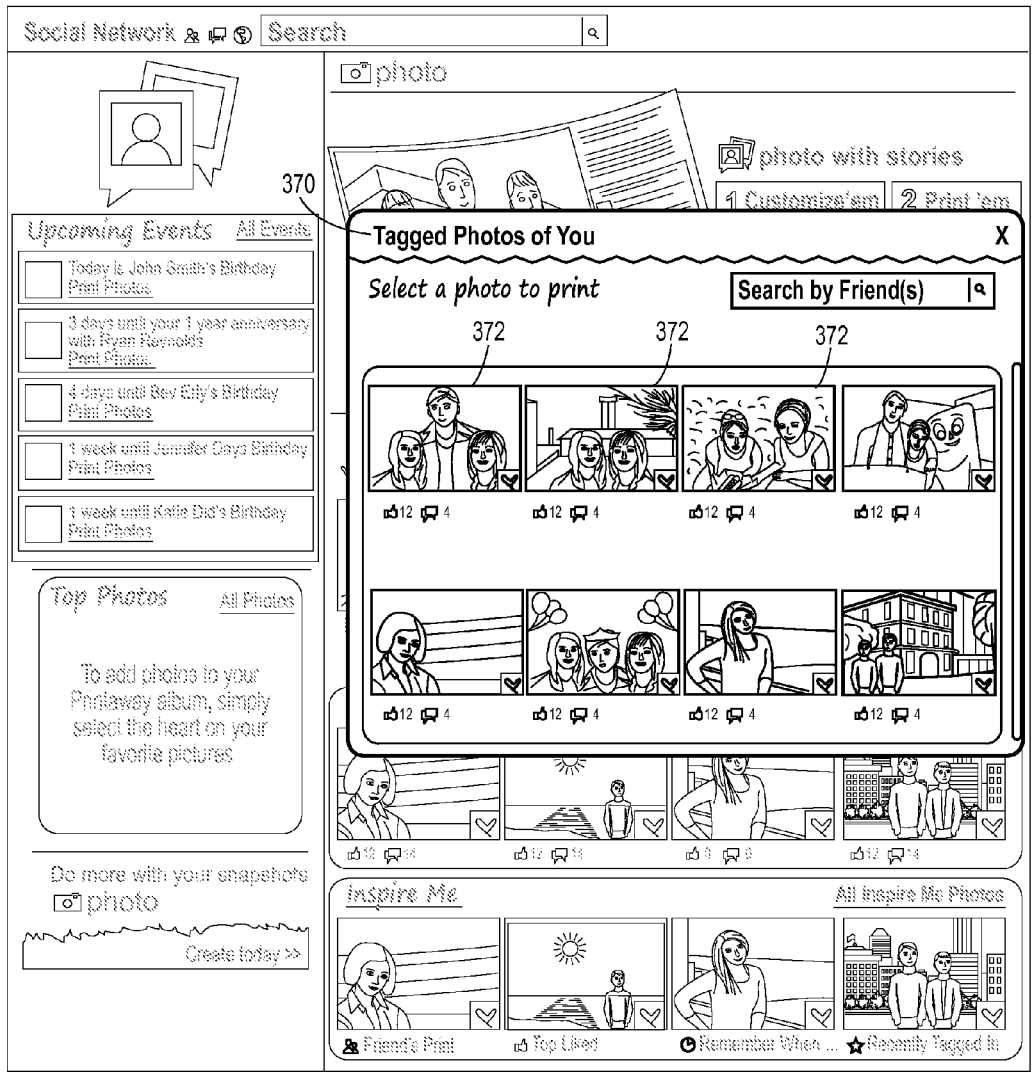
FIG. 7 depicts a landing page of a client application that includes a browser-embedded pop-up window that renders a grid of user-tagged images.

As illustrated in FIG. 2, if the user selects the "Tagged Photos of You" image category 306, the client application 266 may direct the user to an additional web page or to a browser-embedded pop-up window 370 that displays one or more user-identified images 372 that are associated with the identity of the user (i.e. images in which the user is tagged) as shown in FIG. 7. For example, the user or other users of the social network service may tag or identify the user as appearing in an image. Upon selecting the "Tagged Photos of You" image category 306 of FIG. 2, the client application 266 in cooperation with the social network service may retrieve any images that the user has been tagged or identified in as appearing in the image. In response to receiving a user-identified image selection for printing from the user, the client application 266 may direct the user to a print preview page (described below).

Figure 8:
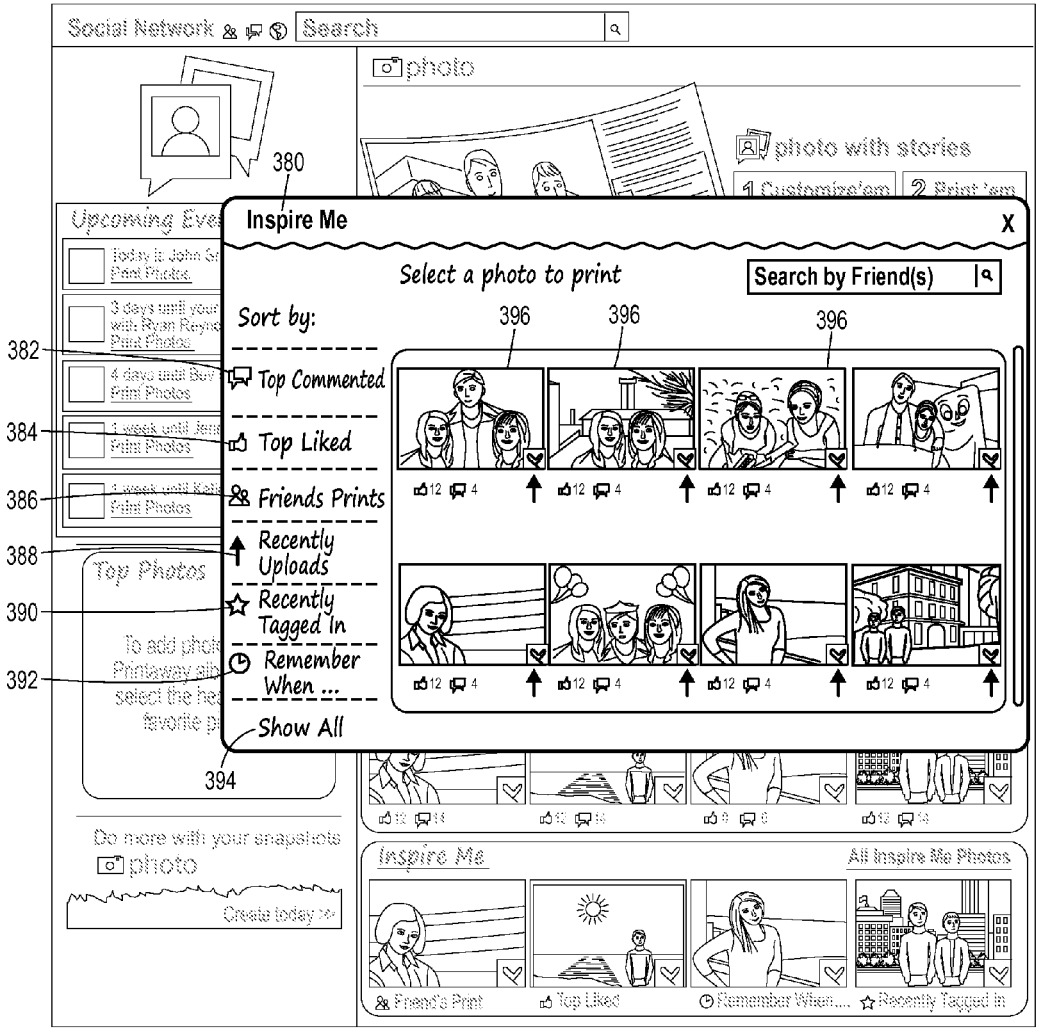
FIG. 8 depicts a landing page of a client application that includes a browser-embedded pop-up window that renders different image categories and a grid of images associated with a user-selected image category.

In response to the selection of the "Inspire Me" image category 308 from the landing page 300 of FIG. 2, the client application 266 may redirect the user to another web page or a browser-embedded pop-up window 380, as shown in FIG. 8, that displays one or more selectable image subcategories. As illustrated in FIG. 8, for example, the client application 266 displays seven image subcategories, "Top Commented" 382, "Top Liked" 384, "Friends' Prints" 386, "Recent Uploads" 388, "Recently Tagged In" 390, "Remember When . . ." 392, and "Show All" 394. Each image subcategory 382-394 of FIG. 8 may correspond to each image subcategory 316-322 under the "Inspire Me" image category of FIG. 2. Upon the user's selection of a particular image subcategory, the client application 266 may use a pre-defined algorithm in determining the one or more images to retrieve from the social networking database which may reside within the server 202, central processing system 140, or a third party remote server (not shown). This third party server may be a part of social networking service and may include a social networking server that may store or contain images that may have been uploaded, social networking attributes, social networking attribute data, or any other information or data that is desired as part of a social networking service. The pre-defined algorithm may include social networking attribute data associated with a particular image as inputs to determine whether the image belongs in the one or more images retrieved. Conforming to the pre-defined algorithm, the client application 266 may use one or more social networking attribute data and may also weight each social networking attribute data differently. The client application 266 may use the pre-defined algorithm determining whether a specific image should be retrieved from the social networking service and displayed to the use. Alternatively, the client application 266 may utilize the pre-defined algorithm in determining the sorting order when displaying the retrieved one or images to the user. In this example, the user has selected the "Recent Uploads" image subcategory 388, and in response, the client application 266 utilizes a pre-defined algorithm associated with the "Recent Uploads" image category 388 to determine a sorting order in displaying the one or more recently uploaded images 396 that are associated with the "Recent Uploads" image subcategory 388. In response to receiving a recently uploaded image selection for printing from the user, the client application 266 may direct the user to a print preview page (described below).

Figure 9:
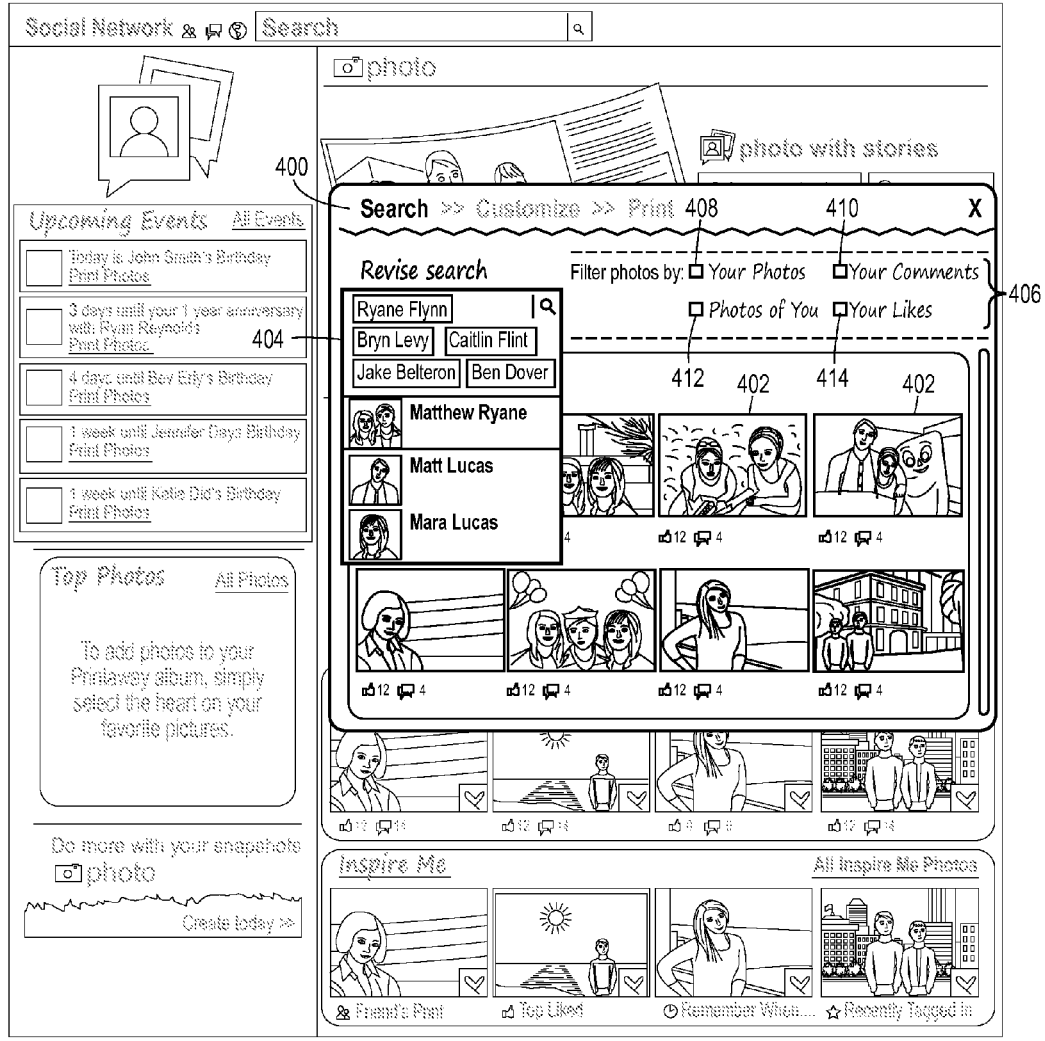
FIG. 9 depicts a landing page of a client application that includes a browser-embedded pop-up window that renders a grid of images associated with a user and/or friends of the user.

Referring back to the landing page 300 of FIG. 2, if the user selects the "Search by Friend(s)" image category 314, the client application 266 may redirect the user to another web page or a browser-embedded pop-up window 400, as shown in FIG. 9, that displays one or more images filtered by a particular user's name 402, a user search box 404, and check box selectors 406. The user may select a name of one or more users in the user search box 404 to view images 402 in which the selected one or more users are identified as appearing in the image. In response to this selection, the client application 266 may retrieve and display the images 402 that are associated the selected user's name or users' names. Furthermore, the user may select additional filters via the check box selectors 406 that limit the displayed images to include only the images that the user has uploaded 408 (e.g. "Your Photos"), images for which the user commented 410 (e.g. "Your Comments"), images that the user has been identified that he or she appears within 412 (e.g. "Photos of You"), or images that the user provided a positive indication 414 (e.g. "Your Likes").

Figure 10:
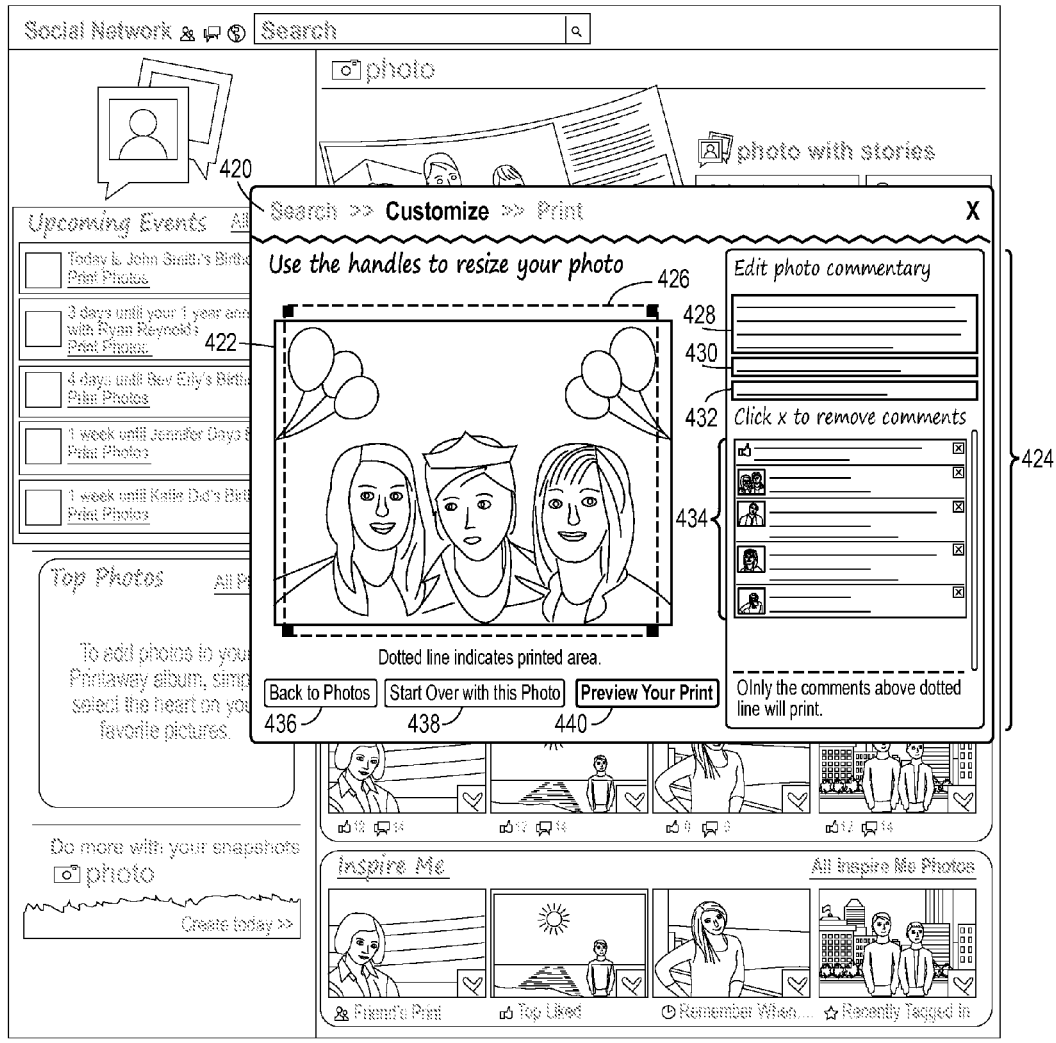
FIG. 10 depicts a landing page of a client application that includes a browser-embedded pop-up window that renders an editable print preview of a user-selected image.

In any event, in response to the user providing a selection of a displayed image via selecting any of the above-mentioned categories and/or subcategories (as shown in FIGS. 2-9), the client application 266 may redirect the user to another web page or a browser-embedded pop-up window 420, as shown in FIG. 10, that displays an editable print preview of a sample layout of the selected image 422 and associated social networking attributes 424. The social networking attributes 424 may include, for example, the names of users 428 identified in the selected image 422, date and location information 430, description information 432, comments 434 associated with the selected image 422. To generate the editable print preview, the client application 266 may retrieve and display any social networking attributes 424 associated with the selected image 422. The client application 266 may allow the user to edit or crop the size of the image via a crop tool 426 to resize the selected image 422 and change the resolution quality of the selected image 422. Additionally, the client application 266 allows the user to edit or delete the social networking attributes 424 from the editable print preview. For example, as shown in FIG. 10, the client application 266 allows the user, under a "Edit photo commentary" heading, to edit the description 432 associated with the selected image 422, the location of where the selected image was taken and the upload date of the selected image 430, etc. Moreover, the client application 266 allows the user to delete comments 434 other users have posted under a "Click x to remove comments" heading. The user may wish to select a different image and may select a "Back to Photos" selector indicator 436 to cause the client application 266 to return to the landing page 300 of FIG. 2. If the user wishes to return to the original social networking attributes before the user edited the social networking attributes, the user may select a "Start Over with this Photo" selector indicator 438 to cause the client application 266 to reset the social networking attributes to their state before the user edited or deleted any social networking attributes. When the user is satisfied with the editable print preview, the user may select a "Preview Your Print" selector icon 440 to cause the client application 266 to redirect the user to a print preview page as shown in FIG. 11.

Figure 11:
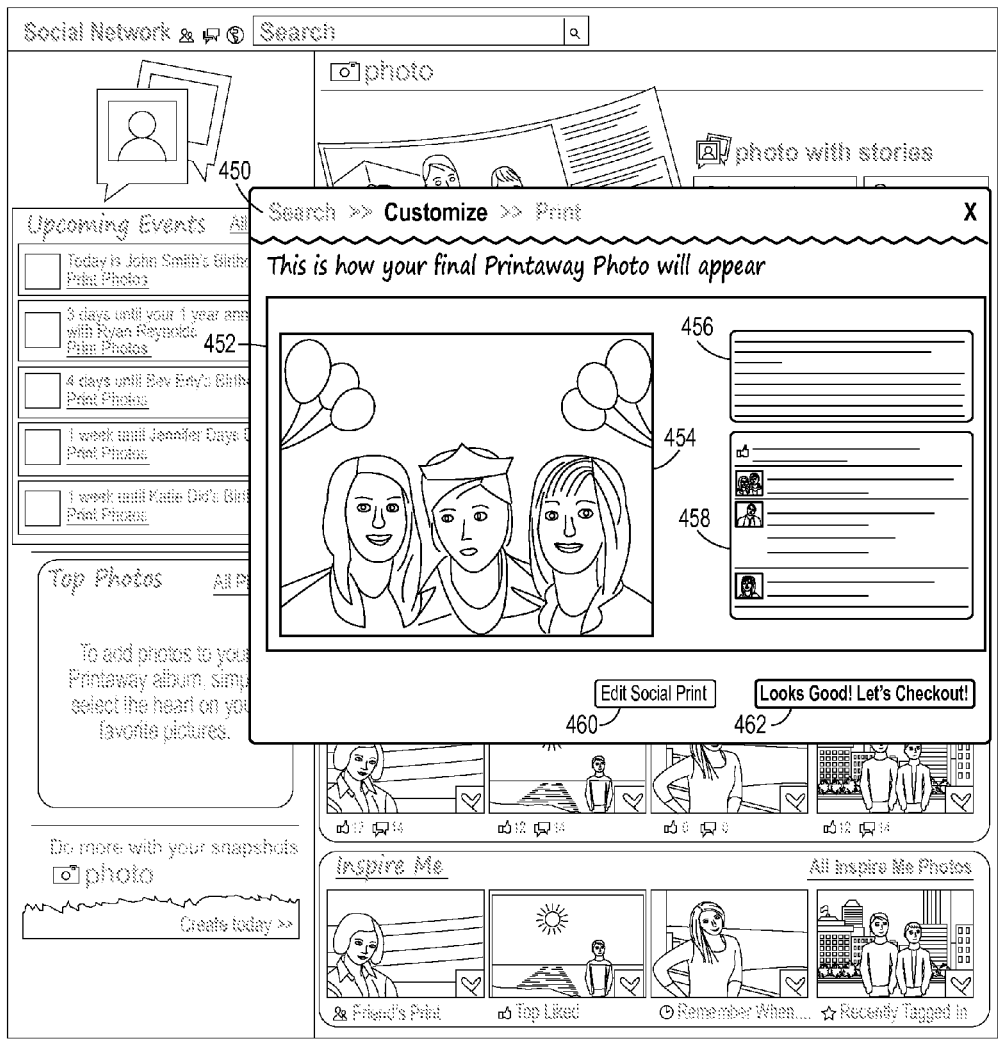
FIG. 11 depicts a landing page of a client application that includes a browser-embedded pop-up window that renders an print preview of a user-selected image.

FIG. 11 illustrates a finalized print preview 452 within a browser-embedded pop-up window 450 that mimics how an image print would appear upon pick-up at a local retail store. The finalized print preview 452 may include the selected image 454, the description information 456 associated with the selected image 454, and comments 458 associated with the selected image 454. If the user wishes to change the image or one or more of the social networking attributes, the user may select a "Edit Social Print" selector icon 460 to cause the client application 266 to redirect the user back to editable print preview page of FIG. 10. Otherwise, if the user is satisfied with the print preview, the user may select a "Looks Good! Let's Checkout!" selector icon 462 that causes the client application 266 to redirect the user to a print order information page of FIG. 12.

Figure 12:
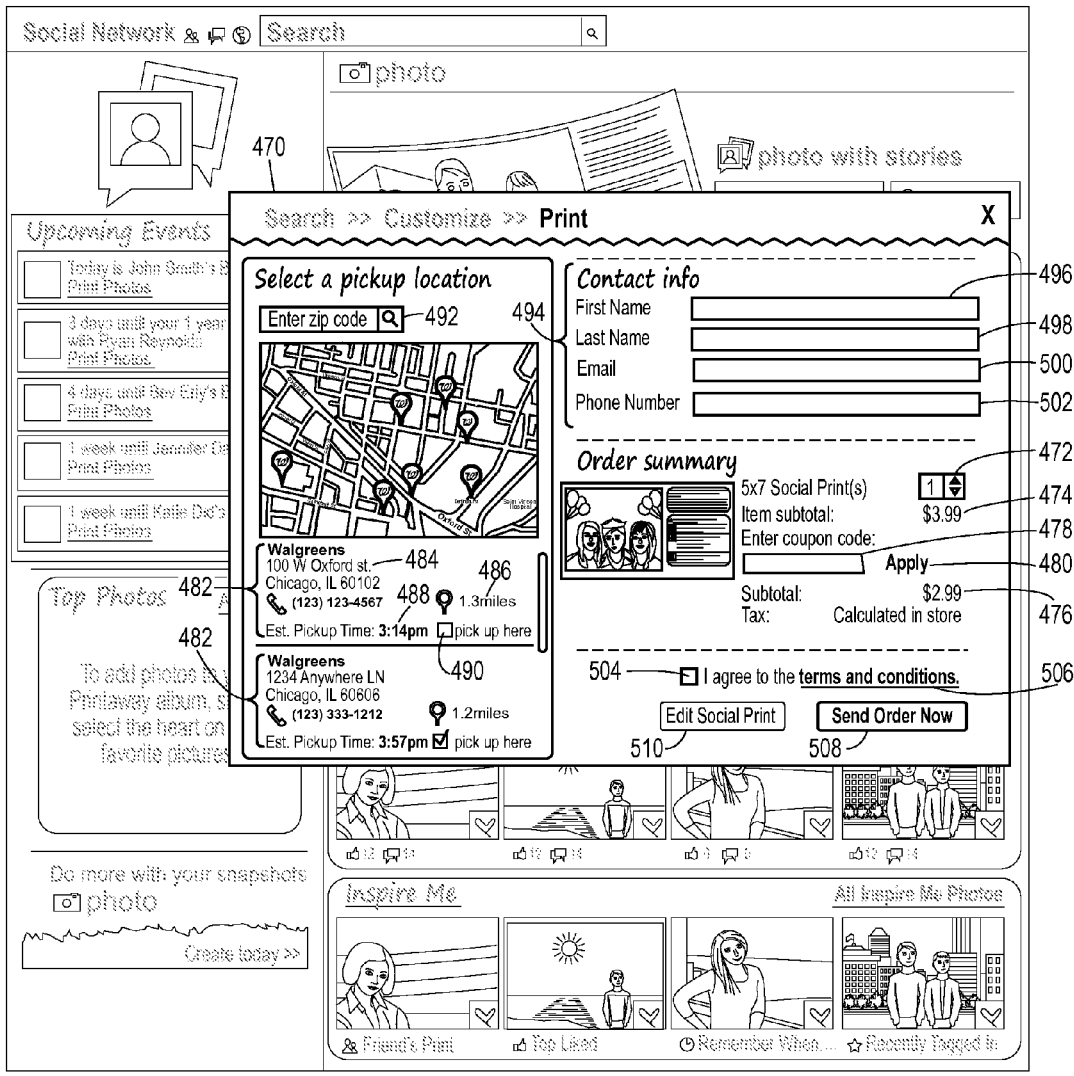
FIG. 12 depicts a landing page of a client application that includes a browser-embedded pop-up window that renders a print order information page screen.

The print order information page within a browser-embedded pop-up window 470 of FIG. 12 may include a size selector icon (not shown) and a quantity selector icon 472. In response to receiving a selection of the size selector icon, the client application 266 may display the availability of one or more print size selections for the selected image or images to the user. For example, upon selecting the size selector icon, the client application 266 may display a selection to print the image or the images on 4"×6" prints, 5"×7" prints, etc. Additionally, the client application 266 may display to the user the corresponding price 474 for each different sized print. Upon receiving a selection for the quantity selector icon 472, the client application 266 may display one or more quantities for which the user may select to print multiple copies of the selected image. Based on the received size and quantity inputs of the user, the client application 266 may calculate the total price 476 or quote (optionally including sales tax) of the print order. Moreover, in calculating the total price, the client application 266 may also include an applied coupon that the user may enter via the "Enter coupon code:" field 478 and "Apply" selector icon 480.

In any event, print order information page may also include one or more retail store selector icons 482 that allow the user to select a particular retail store (associated with a corresponding retail store selector icon) in which to pick up one or more image prints. Each retail store selector icon 482 may include a retail store address 484, a distance 486 to the retail store from the current location of the mobile device, an estimated pickup time 488 at which the image prints will be available for pickup at the retail store, and an option 490 to pick up the print at the retail store. The client application 266 may additionally select the retail store for the user by using a pre-determined default retail store, automatically selecting the most proximal retail store, or using any other manner suitable to determine a retail store. Alternatively, the user may enter a city and state or a zip code into an address field 492 to view retail stores not residing in the immediate geographical area surrounding the current location of the mobile device. For example, in response to receiving a zip code, the client application 266 displays a list of retail store locations within the received zip code.

In any event, the print order information page may also include entry fields for the user to enter biographical information 494, such as a first name entry field 496, a last name entry field 498, an email address entry field 500, and a telephone number entry field 502. The client application 266 may associate the entered biographical information 494 with the print order so that the retail store may release the image prints to the appropriate customer. The print order confirmation screen may also include an instructional area 506 that may inform the user of a terms of use agreement or privacy policy information. The user may agree to the terms of use or the privacy policy by clicking a check box 504, etc. After the user confirms the correctness of the entered biographical information, the pick up retail store location, and the instructional area, the user may select a "Send Order Now" selector icon 508 that finalizes and transmits the print order to the proprietary server. Preferably, the client application 266 does not require the user to log onto the proprietary network or the client application 266 to complete the print order, but rather use the user's biographical information 494 to associate the print order to the user. However, the user may have to log into the social networking service for the client application 266 to gain access images, social networking attributes, and social networking attribute data. If the user desires edit the selected image 454 or associated social networking attributes 456, 458, the user may select the "Edit Social Print" selector icon 510 to invoke the client application 266 to redirect the user back to the finalized print preview 452.

Figure 13:
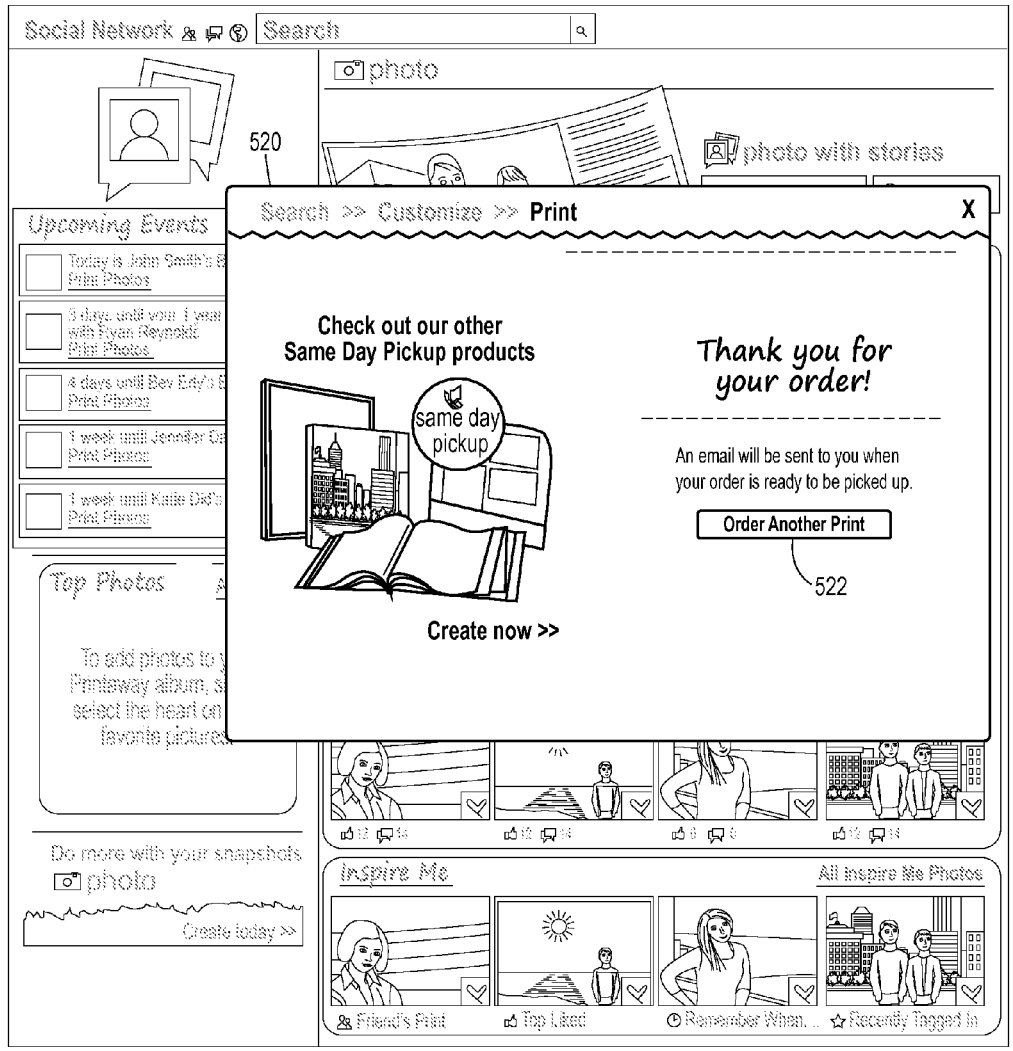
FIG. 13 depicts a landing page of a client application that includes a browser-embedded pop-up window that renders a print order receipt screen.

In any event, in response to receiving a confirmation from the proprietary server that the print order successfully was entered, the client application 266 may display a print order receipt screen within a browser-embedded pop-up window 520, as shown in the FIG. 13, that may be displayed to the user via the mobile device 212. The print order receipt screen may include the size of print, the quantity of print ordered, the total price, the user's biographical information, and pick up retail store location of the print order (not shown). The user may select the "Order Another Print" selector icon 522 when finished reviewing the print order receipt, and in response, the client application 266 may redirect the user to the landing page 300 of FIG. 2.

Figure 14A:
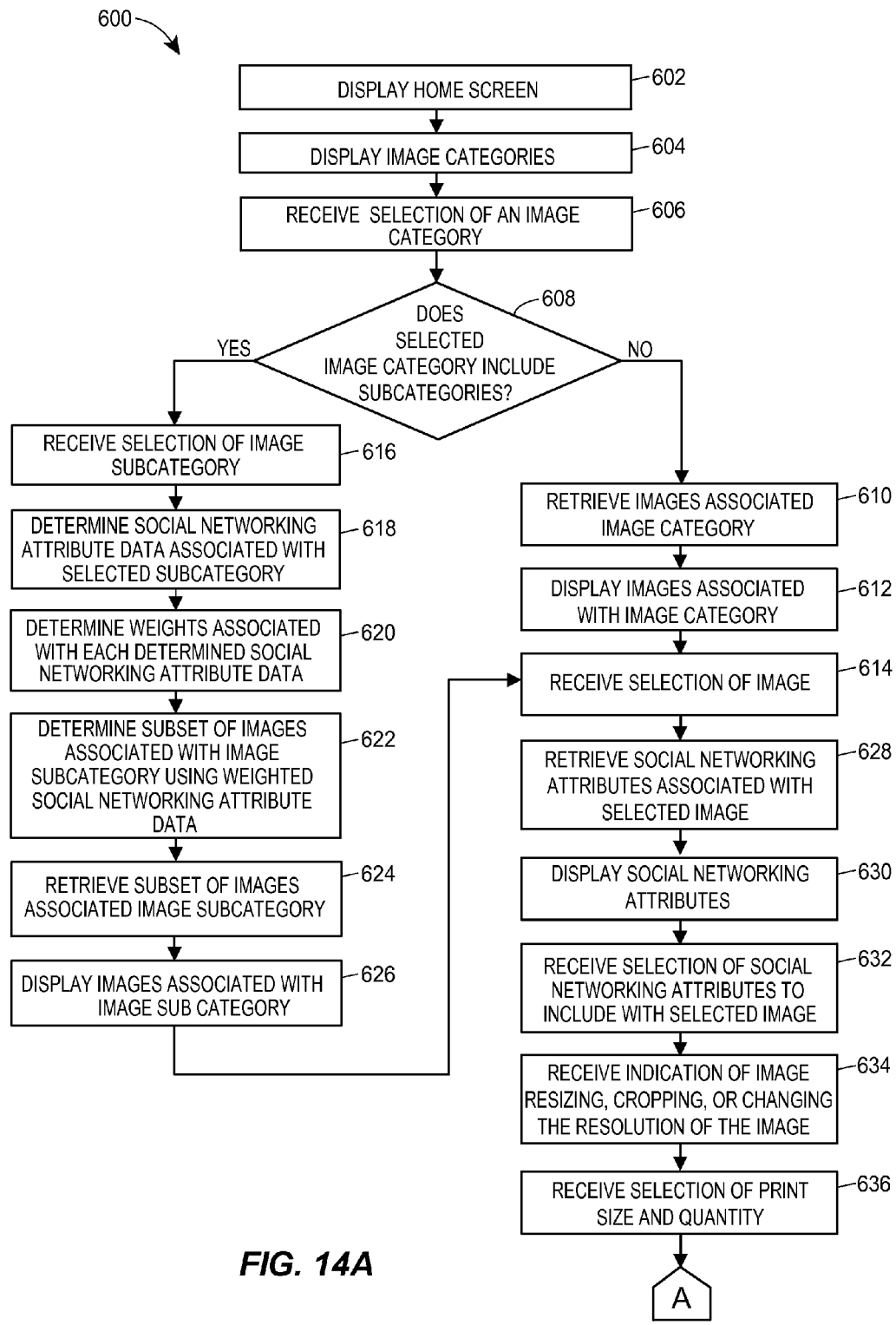
FIG. 14A depicts a first portion of a flow diagram representing an exemplary client-side method for implementing the remote printing system in accordance with the presently described embodiments.
Figure 14B:
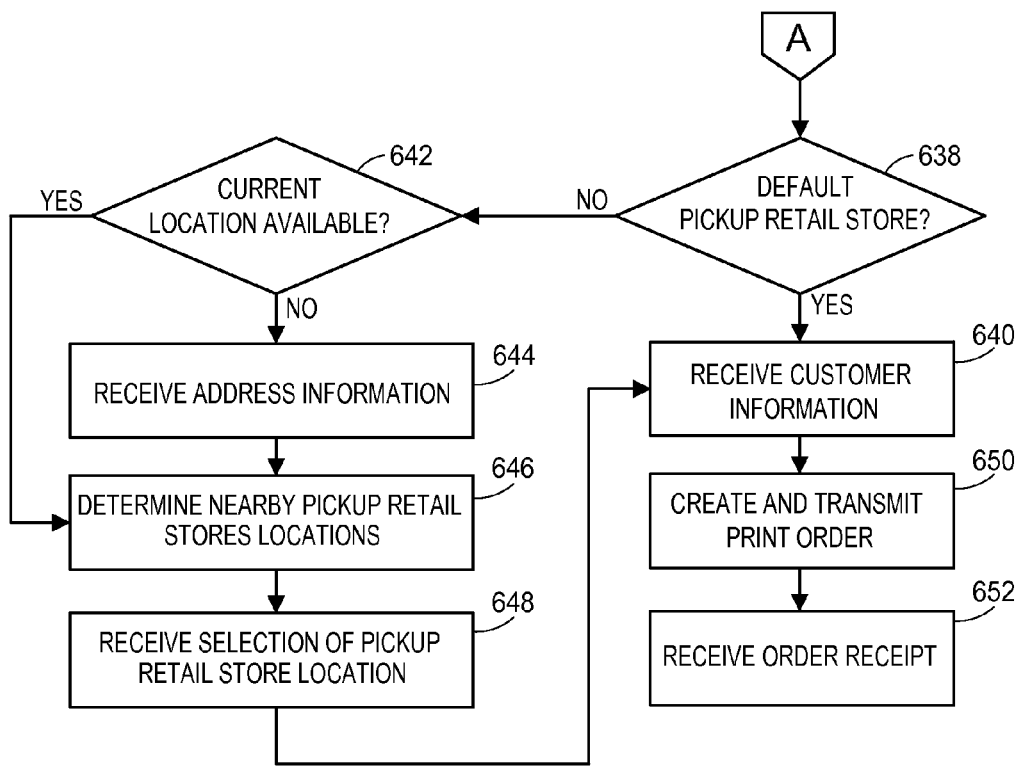
FIG. 14B depicts a second portion of a flow diagram representing an exemplary client-side method for implementing the remote printing system in accordance with the presently described embodiments.

A remote printing method illustrated in FIGS. 14A, 14B provides detail about the exemplary embodiment of the remote printing method 600 executed by the remote printing system 100. After the remote printing system 100 receives a command from the user to execute an instance of the client application 266, the client application 266 displays the landing page 300, as shown in FIG. 2, to the user via the display 240 of the mobile device 212 (block 602) of FIG. 14A. The client application 266 may display one or more image categories (block 604) to the user and, in response, may receive a selection of one of the one or more image categories (block 606). The image categories may be stored on the client device memory 242, or alternatively, the client application 266 may query and retrieve all possible image categories from the social networking server. If the image category does not include or is not associated with any subcategories (block 608), the client application 266 may retrieve one or more images associated with the selected image category (block 610) and display the retrieved one or more images to the user via the display interface 240 (block 612). For example, the "Tagged Photos of You" image category 306 may use the social networking attribute of an identification or tag that refers to the user in retrieving any image that includes a tag associated with the user. The user may select one of the displayed images that are associated with the selected image category (block 614).

On the other hand, if the selected category does include subcategories (block 616), the client application 266 may retrieve all subcategories associated with the selected category, as shown in FIG. 14A, in a similar manner as described above with the image category. The client application 266 may display the subcategories to the user and may receive a selection of one of the displayed subcategories (block 616). In determining the one or images associated with the subcategory, the client application 266 may utilize a pre-defined algorithm that may use social networking attribute data as inputs (block 618). The client application 266 may also use the pre-defined algorithm to determine sorting order in displaying the one or images associated with the image subcategory to the user. For example, in receiving a selection of the "Inspire Me" image category 308 and a selection of the "Top Commented" image subcategory 382 as shown in FIG. 8, the client application 266 may utilize a pre-defined algorithm to determine one or more images associated with the "Top Commented" image subcategory 382 and may sort those determined one or more images for display to the user. In this example, the inputs for the pre-defined algorithm for the "Top Commented" image subcategory 382 may include different types of social networking attribute data, such as a number of comments associated with an image, the number of positive indications or likes associated with an image, whether an image was uploaded within the last week, etc. Additionally, each social networking attribute data input may be weighted differently depending on the significance of the social networking attribute data input (block 620). For example, the pre-defined algorithm for the "Top Commented" image subcategory 382 may include giving double weight (e.g. allotting 2 points) per each comment associated with an image while only assigning half weight (e.g. allotting 0.5 points) per each positive indications or "likes." The pre-defined algorithm may add or average the points or weights to determine a ranking amongst the processed images, and the client application 266 may use the ranking to determine which one or more images should be retrieved or a sorting order of the retrieved one or more images (block 622). The weights or points may be allotting in any suitable manner, such as subtracting a quarter weight (e.g. 0.25 points) for every day since an image was uploaded, weighting an image in which the user is tagged in higher than other users, etc. Of course, the above pre-defined algorithm is not meant to limit any inputs or weighted data for any image category or image subcategory. The client application 266 may retrieve the one or more determined images that belong to a subset of images associated with the selected image subcategory (block 624).

In any event, as shown in FIG. 14A, the client application 266 may display the retrieved one or more images associated with the image subcategory using the pre-defined algorithm (block 626) and may receive a selection of an image (block 614). The client application 266 may retrieve any social networking attributes associated with the user-selected image (block 628) and may display the selected image and associated social networking attributes to the user in an editable print preview page (block 630). Additionally, the client application 266 may receive edits or deletes to retrieved social networking attributes (block 632). For example, the user may wish to delete an inappropriate comment made by another friend or may wish to correct the location at which the image was photographed. Advantageously, the user may include any or all associated social networking attributes with the image, giving the user context, location and date information, the other users or friends that appear in the image, etc. Moreover, the client application 266 may receive indications of image resizing, cropping, changing the resolution, or any other suitable photo-editing of the image (block 634). In response to receiving an indication that the user is satisfied with the editable print preview, the client application 266 may direct the user to selection a print size and quantity of prints.

The client application 266 may display the available print sizes and available quantities of the prints (e.g. the print order information screen in FIG. 12) to the user for the user's selection. In response to receiving a selection of the print size and the quantity of prints (block 636) as shown in FIG. 14A, the client application 266 may determine whether a default pickup retail store has been selected (block 638), as shown in FIG. 14B. The default pickup retail store may be a retail store that the user most often frequents, a retail store that is closest to the user's home or work, etc. If a default pickup retail store has been determined by the user, the client application 266 may request the user's biographical information for the print order (block 640) by displaying, for example, the print order confirmation screen as shown in FIG. 9.

On the other hand, if the user has not determined the default pickup retail store, the client application 266, as shown in FIG. 14B, may execute a location awareness application that coordinates with the GPS unit to geo-locate the current location of the web-enabled device (block 642). If the current location of the web-enabled device is available, the client application 266 may determine a list of proximal retail stores to the current location and may display only the retail stores that include the shortest distance to the current location of the web-enabled device (block 646). On the other hand, if the current location is not available, the client application 266 may only receive address information from the user (block 644), such as receiving address information from the user via the address field on the retail store selection screen in FIG. 8. Using the location associated with the entered address information, the client application 266 may determine a list of proximal retails stores to the location associated with the entered address information (block 646) and may display only the retail stores that include the shortest distance to the location associated with the entered address information. The user may select a desired retail store from the displayed retail stores via the retail store selector icons (block 648), for example. In response to receiving a selection of the retail store, the client application 266 may request biographical information from the user, as described above (block 640).

Upon receiving biographical information from the user, the client application 266 may create and transmit the print order and associated biographical information to the proprietary server (block 650). If the print order is successfully received by the proprietary server, the client application 266 266 may receive a print order receipt and may display the receipt to the user (block 652).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method of creating a print order for one or more image prints associated with a social networking service for pick-up at a retail store, the method executed by one or more computer processors programmed to perform the method, the method comprising:

receiving a command to execute an image display interface operable to display one or more images on a client device;

causing the image display interface to display one or more social networking image categories to a user, each social networking image category specifying one or more images associated with the social networking image category, wherein at least one of the one or more social networking image categories includes one or more social networking image subcategories, each social networking image subcategory specifying a subset of the one or more images associated with the at least one social networking image category;

receiving a selection of the at least one social networking image category and one of the one or more social networking image subcategories;

using the selected social networking image subcategory to retrieve the subset of the one or more images associated with the selected social networking image subcategory from a social networking database;

causing the image display interface to display to the user the retrieved subset of the one or more images associated with the selected social networking image subcategory;

receiving from the user a selection of an image of the displayed subset of the one or more images associated with the selected social networking image subcategory to include in the print order;

retrieving from the social networking database social networking attributes associated with the selected image;

receiving from the user a selection of social networking attributes associated with the selected image to include with the selected image on the image print;

receiving from the user print order information associated with the selected image;

transmitting to a server the selected image, selected social networking attributes associated with the selected image, and the print order information associated with the selected image;

receiving from the server order receipt information;

causing the image display interface to display to the user the order receipt information; and transmitting to the server a command to cause the printing of the selected image and the selected social networking attributes associated with the selected image according to the print order information associated with the selected image at the retail store for purchase and pick-up.

2. The method of claim 1, wherein the social networking image category comprises at least one of: a photograph album including uploaded images of the user, a photograph album including images that the user has specifically selected, images associated with upcoming events, images associated with specific other users that are specified by the user, or images associated with the user.

3. The method of claim 1, further comprising:
using the selected social networking image subcategory to determine social networking attribute data associated with the selected social networking image subcategory; and
using the social networking attribute data associated with the selected social networking image subcategory to determine one or more images associated with the selected social networking image category.

4. The method of claim 3, wherein the social networking image subcategory comprises at least one of: images associated with the most comments, images associated with the most positive indications of other users, images that are most recently uploaded to the social networking database, images that have been printed by other users, images in which the user has been recently identified by another user, or images that were previously uploaded a specific amount of time in the past.

5. The method of claim 4, wherein determining the one or more images associated with the selected social networking image category includes assigning each of the social networking attributes different weight and using the weighted social networking attributes to determine the one or more images to associate with the selected social networking image category.

6. The method of claim 5, wherein the social networking attributes comprises at least one of: one or more comments associated with the selected image, one or more positive indications of the user or other users associated with the selected image, description information associated with the selected image, a location of where the selected image was generated, a date that the selected image was uploaded to the social networking database, or an indication of the identity of a at least one other user appearing in the selected image.

7. The method of claim 1, wherein the social networking attributes comprise at least one of: one or more comments associated with the selected image, one or more positive indications of the user or other users associated with the selected image, description information associated with the selected image, a location of where the selected image was generated, a date that the selected image was uploaded to the social networking database, or an indication of the identity of a at least one other user appearing in the selected image.

8. The method of claim 7, wherein receiving from the user a selection of one or more social networking attributes associated with the selected image to include with the selected image on the image print includes editing or deleting one or more retrieved social networking attributes associated with the selected image.

9. The method of claim 1, further comprising at least one of: cropping the selected image, resizing the selected image, or changing the resolution of the selected image.

10. The method of claim 1, wherein receiving from the user print order information associated with the selected image includes receiving from the user a selection of at least one of: a print size, a print quantity, a print medium, a retail store, customer information, and a promotion discount code.

11. The method of claim 1, further comprising:
determining using the location of the client device a proximal retail store; and
associating the determined proximal retail store with the print order information.

12. The method of claim 11, wherein determining using the location of the client device a proximal retail store includes geo-locating the client device to determine the location of the client device.

13. A non-transitory computer-readable storage medium having stored thereon a set of instructions, executable by a processor, for creating a print order for one or more image prints associated with a social networking service for pick-up at a retail store, the instructions comprising:
instructions for receiving a command to execute an image display interface operable to display one or more images on a client device;
instructions for causing the image display interface to display one or more social networking image categories to a user, each social networking image category specifying one or more images associated with the social networking image category, wherein at least one of the one or more social networking image categories includes one or more social networking image subcategories, each social networking image subcategory specifying a subset of the one or more images associated with the at least one social networking image category;
instructions for receiving a selection of the at least one social networking image category and one of the one or more social networking image subcategories;
instructions for using the selected social networking image subcategory to retrieve the subset of the one or more images associated with the selected social networking image subcategory from a social networking database;
instructions for causing the image display interface to display to the user the retrieved subset of the one or more images associated with the selected social networking image subcategory;
instructions for receiving from the user a selection of an image of the displayed subset of the one or more images associated with the selected social networking image subcategory to include in the print order;

instructions for retrieving from the social networking database social networking attributes associated with the selected image;

instructions for receiving from the user a selection of social networking attributes associated with the selected image to include with the selected image on the image print;

instructions for receiving from the user print order information associated with the selected image;

instructions for transmitting to a server the selected image, selected social networking attributes associated with the selected image, and the print order information associated with the selected image;

instructions for receiving from the server order receipt information;

instructions for causing the image display interface to display to the user the order receipt information; and instructions for transmitting to the server a command to cause the printing of the selected image and the selected social networking attributes associated with the selected image according to the print order information associated with the selected image at the retail store for purchase and pick-up.

14. The computer-readable storage medium of claim 13, wherein instructions for receiving from the user a selection of one or more social networking attributes associated with the selected image to include with the selected image on the image print includes editing or deleting one or more retrieved social networking attributes associated with the selected image.

15. The computer-readable storage medium of claim 13, wherein the social networking attributes comprise at least one of: one or more comments associated with the selected image, one or more positive indications of the user or other users associated with the selected image, description information associated with the selected image, a location of where the selected image was generated, a date that the selected image was uploaded to the social networking database, or an indication of the identity of a at least one other user appearing in the selected image.

16. The computer-readable storage medium of claim 13, the instructions further comprising:

instructions for determining using the location of the client device a proximal retail store; and instructions for associating the determined proximal retail store with the print order information.

17. The computer-readable storage medium of claim 16, wherein instructions for determining using the location of the client device a proximal retail store includes geo-locating the client device to determine the location of the client device.

18. A system for creating a print order for one or more image prints associated with a social networking service for pick-up at a retail store, the system comprising:

a communications network;

a client device communicatively coupled to the communication network and to an image display interface;

a server communicatively coupled to the communication network, the server comprising a computer-readable medium storing instructions, executable by a processor in the server to:

cause the image display interface to display one or more social networking image categories to a user, each social networking image category specifying one or more images associated with the social networking image category, wherein at least one of the one or more social networking image categories includes one or more social networking image subcategories, each social networking image subcategory specifying a subset of the one or more images associated with the at least one social networking image category;

receive from a client device, via the network, a selection of the at least one social networking image category and one of the one or more social networking image subcategories;

receive from the client device, via the network, a selection of an image associated with the social networking image subcategory to include in the print order;

receive from the client device, via the network, a selection of one or more social networking attributes associated with the selected image to include with the selected image on the image print;

receive from the client device, via the network, print order information associated with the selected image;

transmit to the client device, via the network, order receipt information; and cause the printing of the selected image and the selected social networking attributes associated with the selected image according to the print order information associated with the selected image at the retail store for purchase and pick-up.

19. The method of claim 18, wherein the social networking image category comprises at least one of: a photograph album including uploaded images of the user, a photograph album including images that the user has specifically selected, images associated with upcoming events, images associated with specific other users that are specified by the user, or images associated with the user.

20. The system of claim 18, wherein the social networking attributes comprise at least one of: one or more comments associated with the selected image, one or more positive indications of the user or other users associated with the selected image, description information associated with the selected image, a location of where the selected image was generated, a date that the selected image was uploaded to the social networking database, or an indication of the identity of a at least one other user appearing in the selected image.

21. The system of claim 18, wherein the received print order information associated with the selected image includes a selection of at least one of: a print size, a print quantity, a print medium, a retail store, customer information, and a promotion discount code.

* * * * *